US006901071B2

(12) United States Patent
Lu

(10) Patent No.: US 6,901,071 B2
(45) Date of Patent: May 31, 2005

(54) ROW UPGRADE FOR A SCALABLE SWITCHING NETWORK

(76) Inventor: Haw-minn Lu, 10733 Calston Way, San Diego, CA (US) 92126

(*) Notice: Subject to any disclaimer, the term of this patent is extended or adjusted under 35 U.S.C. 154(b) by 407 days.

(21) Appl. No.: 09/897,263

(22) Filed: Jul. 2, 2001

(65) Prior Publication Data

US 2003/0002437 A1 Jan. 2, 2003

(51) Int. Cl.[7] .............................................. H04L 12/55
(52) U.S. Cl. ...................................................... 370/388
(58) Field of Search ................................ 370/254, 367, 370/370, 371, 372, 386, 387, 388, 400

(56) References Cited

U.S. PATENT DOCUMENTS 5,841,775 A * 11/1998 Huang ......................... 370/422
6,049,542 A *  4/2000 Prasad ......................... 370/386

OTHER PUBLICATIONS

Cizek et al. "The Tradeoff Betwen Cost and Reliability in Packet Switching MultiSTage Interconnection Networks". IEEE. Sep. 1992. p. 365–368.*
Agrawal, "Testing and Fault–Tolerance of Multistage Interconnection Networks," Computer, Apr. 1982, pp. 41–53, vol. 15, No. 4, IEEE, US.
Bhuyan, et. al "Design and Performance of Generalized Interconnection Networks." IEEE Transactions on Computers, Dec. 1983, pp. 1081–1090, vol. 32, No. 12, IEEE, US.
Blake, et. al "Multistage Interconnection Network Reliability," IEEE Transactions on Computers, Nov. 1989, pp. 1600–1603, vol. 38, No. 11, IEEE, US.
Chin, et. al "Packet Switching Networks for Multiprocessors and Data Flow Computers," IEEE Transactions on Computers, Nov. 1984, pp. 991–1003, vol. 33, No. 11, IEEE, US.
Kumar, et. al "Failure Dependent Performance Analysis of a Fault–Tolerant Multistage Interconnection Network," IEEE Transactions on Computers, Dec. 1989, pp. 1703–1713, vol. 38, No. 12, IEEE, US.
Tzeng, et. al "Realizing Fault–Tolerant Interconnection Network via Chaining," IEEE Transactions on Computers, Apr. 1988, pp. 458–462, vol. 37, No. 4, IEEE, US.
Varma, et. al "Fault–Tolerant Routing in Multistage Interconnection Networks," IEEE Transactions on Computers, Mar. 1989, pp. 385–393, vol. 38, No. 3, IEEE, US.

* cited by examiner

Primary Examiner—Chi Pham
Assistant Examiner—Derrick W Ferris

(57) ABSTRACT

A redundant multi-stage network can be upgraded in a non-stop manner via a bypass and a rewiring phase. The bypass phase involves selecting two adjacent rows as close to the middle of the network as possible thus maximizing the path redundancy and maximizing the number of paths around an upgrade induced fault; creating a bypass and original section by stretching the connections between these two rows, breaking a connection in the bypass section; inserting new nodes into the bypass section by connecting the top and bottom ports of each node in an alternating manner to minimize the node's input and output traffic imbalance; and repeating for all the connections in the bypass section. The rewiring phase involves creating a hole by disconnecting one end of a bypass connections; locating the connection that should be connected to the hole, filling the hole by connecting the other end of this connection to the hole thus minimizing the number of open holes and minimizing the throughput disruption; repeating this for any hole generated in the process; and repeating the rewiring phase for all the remaining connections in the bypass section.

14 Claims, 19 Drawing Sheets

Procedure Stretch
Begin
Select an upper row and call it upper_row;
Assemble a row of routers to be inserted and call it inserted_row;
For all the upper_row bottom ports;
    Begin
    Disconnect the connection to this port;
    Connect the disconnected connection to the corresponding inserted_row
        bottom port;
    Connect this upper_row bottom port to the corresponding inserted_row
        top port;
    End
End

Fig. 5

Procedure Rewire
Begin
For all upper_row bottom ports not connected to the proper inserted_row top port;
    Begin
    Disconnect the connection from the upper_row bottom port;
    For all the disconnected upper_row bottom ports;
        Begin
        locate the inserted_row top port that should be connected to this
            disconnected upper row bottom port;
        disconnect the other end of the connection currently connected to the
            located inserted_row top port;
        connect the disconnected other end of the connection to this
            disconnected upper_row bottom port;
        End
    End
End

ROW UPGRADE FOR A SCALABLE SWITCHING NETWORK

BACKGROUND

1. Field of Invention

This invention relates to redundant multi-stage switching networks, specifically to the non-stop addition of a new row to such a network.

2. Discussion of Prior Art

When a multi-stage switching network such as a Banyan or Butterfly network is expanded a new row must be added. Adding a new row requires that half of the external connections have to be disconnected in the process. This leads to an interruption in service.

A Butterfly network, 10, is shown in FIG. 1 with top ports, 11, connected to external connections, 12, and bottom ports, 13, connected to external connections, 14. A duplicate of this network, 15, with top ports, 16, and bottom ports, 17. A new row, 18, with top ports, 19, and bottom ports, 20, are also shown.

In order to double number of external connections of the Banyan network, 10, the connections between the top ports, 11, and external connections, 12, have to be broken and connected to the left half of new row bottom ports, 20, and the external connections, 12, connected to the left half of new row top ports, 19. To complete the upgrade, the duplicate network top ports, 16, are connected to the right half of new row bottom ports 20. At this point, duplicate network bottom ports, 17, and right half of new row top ports 19 would be available for new external connections.

The problem is that the connections between the original network top ports 11, and external connections, 12, have to be disconnected in the process. This leads to an interruption in service.

Currently, special "hot slide" multiplexers are designed into switching centers to allow a new switching network to be installed in parallel and then switched in between clock cycles. Unfortunately, this physical electrical switch-over is only part of the problem. The new switch has to have exactly the same "control state" information as the old switch. This requires a considerable amount of hardware and software to accomplish correctly.

Objects and Advantages

Accordingly, the several objects and advantages of my invention are:

(a) to provide a procedure by which a redundant multi-stage switching network can be upgraded without having to break an external connection; and (b) to provide a procedure by which a redundant multi-stage switching network can be upgraded with a minimum loss in throughput bandwidth.

Further objects and advantages of our invention will become apparent from a consideration of the drawings and ensuing description.

DESCRIPTION OF DRAWINGS

FIG. 5 shows the algorithm for inserting a row of new routers into a stretched blocking compensated cyclic group multi-stage switching network.

FIG. 6 shows the algorithm for rewiring the stretched portion of the multi-stage network into a blocking compensated cyclic group multi-stage switching network.

SUMMARY

A redundant multi-stage switching network can be upgraded without breaking any external connections by inserting a new row of nodes inside the network rather than at the edges of the network. It is best to insert the new row nodes as close to the center of the network as possible since this is the region with the highest path redundancy and this maximizes opportunities for traffic to route around an upgrade induced fault.

The row insertion process can be broken into two steps. One is a bypass phase and the other is a rewiring phase. In the bypass phase, the connections between two rows of nodes is stretched to form a bypass and a original section. Each connection in the bypass section is then broken and connected to a new node. This process is repeated for all the bypass connections. It is important that only one bypass connection be broken at a time since this minimizes the imbalance in the new node's input and output traffic.

In the rewiring phase, the bypass connection is rewired into the desired topology. This is accomplished by creating a "hole" by disconnecting one of the bypass connections; locating the connection that should be connected to this "hole," disconnecting the mis-connected end of this connection, filling the "hole" by connecting mis-connected end of this connection to the "hole." Repeating this process for any "hole" generated in the process. Generating a new "hole" by disconnecting one of the remaining bypass connections. Repeating the process until all the bypass connections have been selected. It is important to fill a "hole" as soon as possible since it represents a reduction in network throughput.

DESCRIPTION OF INVENTION

Figure 1:
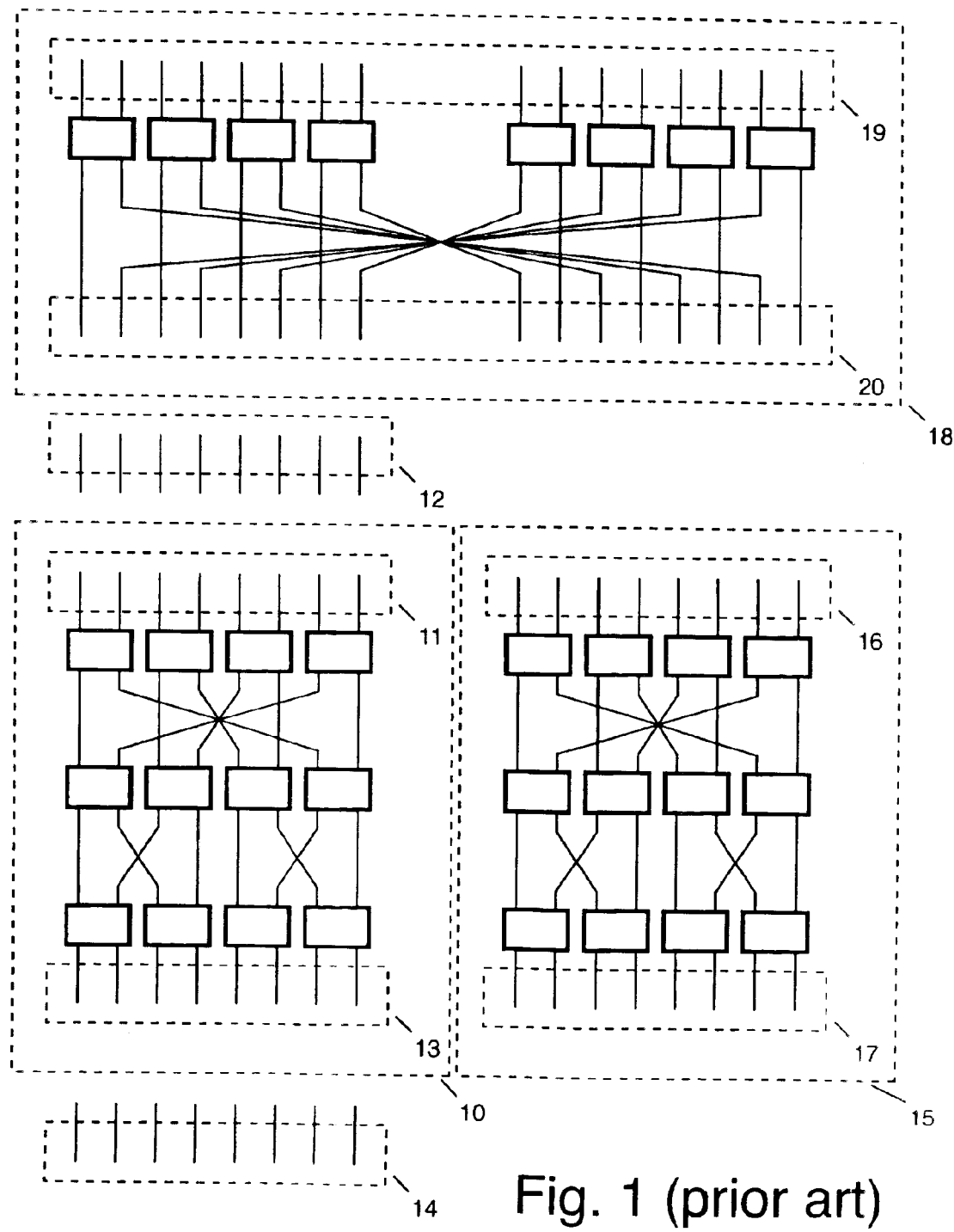
FIG. 1 shows a 16 port Butterfly multi-stage switching network being upgraded. (prior art)
Figure 2:
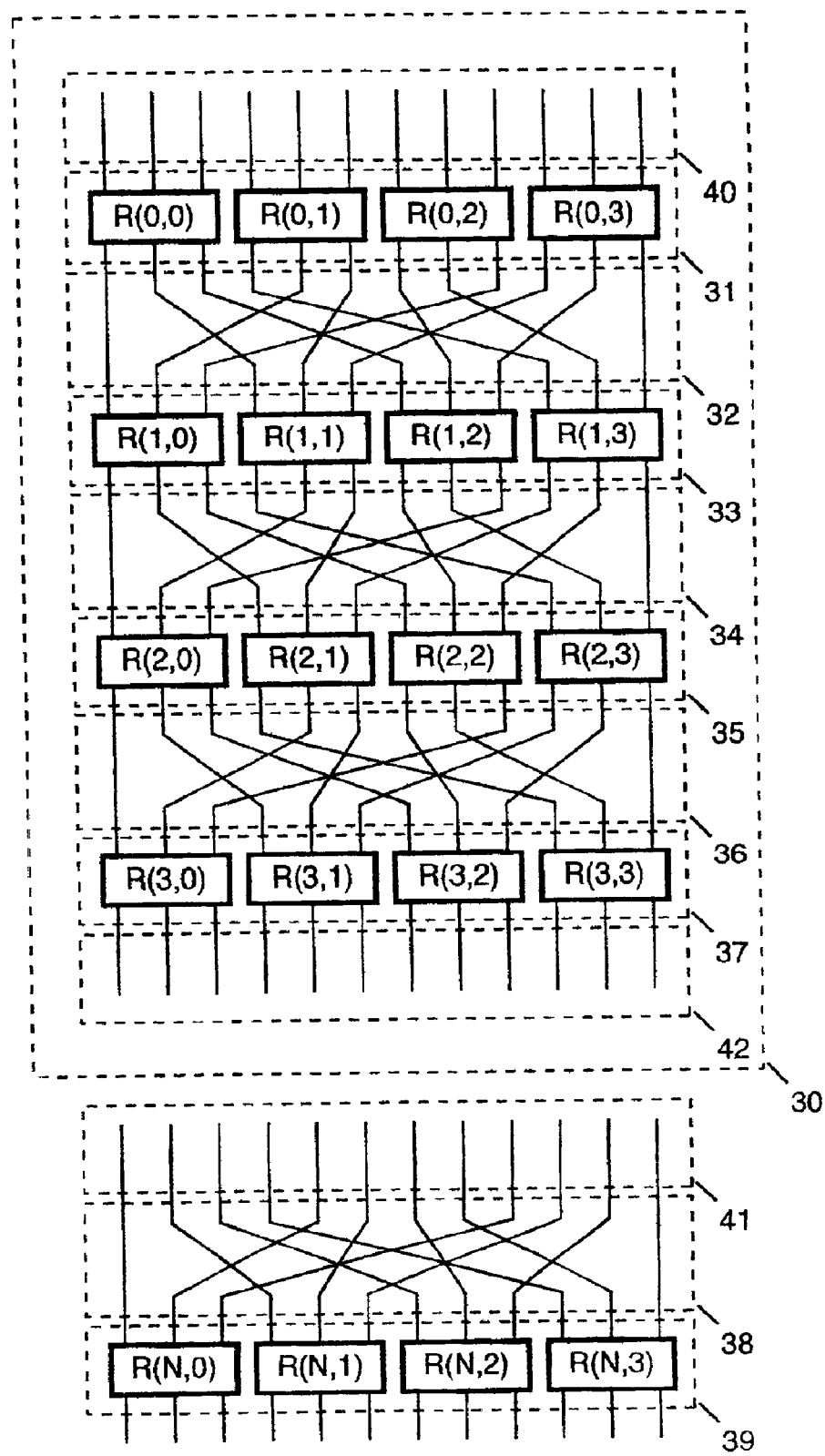
FIG. 2 shows a 24 port redundant blocking compensated cyclic group (RBCCG) multi-stage switching network from the prior art along with an new interconnection network and new row of routers.

A redundant blocking compensated cyclic group (RBCCG) multi-stage network, 30, is shown in FIG. 2 and discussed further in U.S. Pat. No. 5,841,775, "Scalable Switching Networks" by Alan Huang, Nov. 24, 1998. It consists of a rows, 31, 33, 35, and 37 of routers. These rows of routers are connected together via interconnection networks 32, 34, and 36. The routers are designed R (row, column) where the top left most router is denoted R(0,0). The top ports of each router are numbered from left to right starting with 0. The bottom ports of each router are numbered from left to right starting with 0. The top ports of each interconnection network are numbered from left to right starting with 0. The bottom ports of each interconnection network are numbered from left to right starting with 0.

A new interconnection network 38 and a new row of routers 39 can be inserted between router row 33 and interconnection network 34. This can be accomplished by disconnecting the bottom ports of router row 33 from the top ports of interconnection network 34; connecting the bottom ports of router row 33 to the top ports of new interconnection network 38; connecting the bottom ports of new interconnection network 38 to the top ports of new router row 39; and connecting the bottom ports of new router row 39 to the top ports of interconnection network 34. This can be accomplished without breaking the connections between the top ports of router row 31 and external connections 40 or breaking the connections between the bottom ports of router row 37 and external connections 42.

The new row of routers and new interconnection network can also be inserted between router row 31 and interconnection network 32 and between router row 35 and interconnection network 36; however it is best to insert the new row of routers and new interconnection network as close to the middle of the network as possible. This is because the middle of a RBCCG network has the greatest number of redundant paths. This minimizes any effects on throughput bandwidth during an upgrade by maximizing the number of paths to which traffic can be diverted.

The inserting of a new row of routers and a new interconnection network must be done in a certain manner in order to minimize disruption of throughput bandwidth. The procedure consists of a stretch and a rewire phase.

Figure 7:
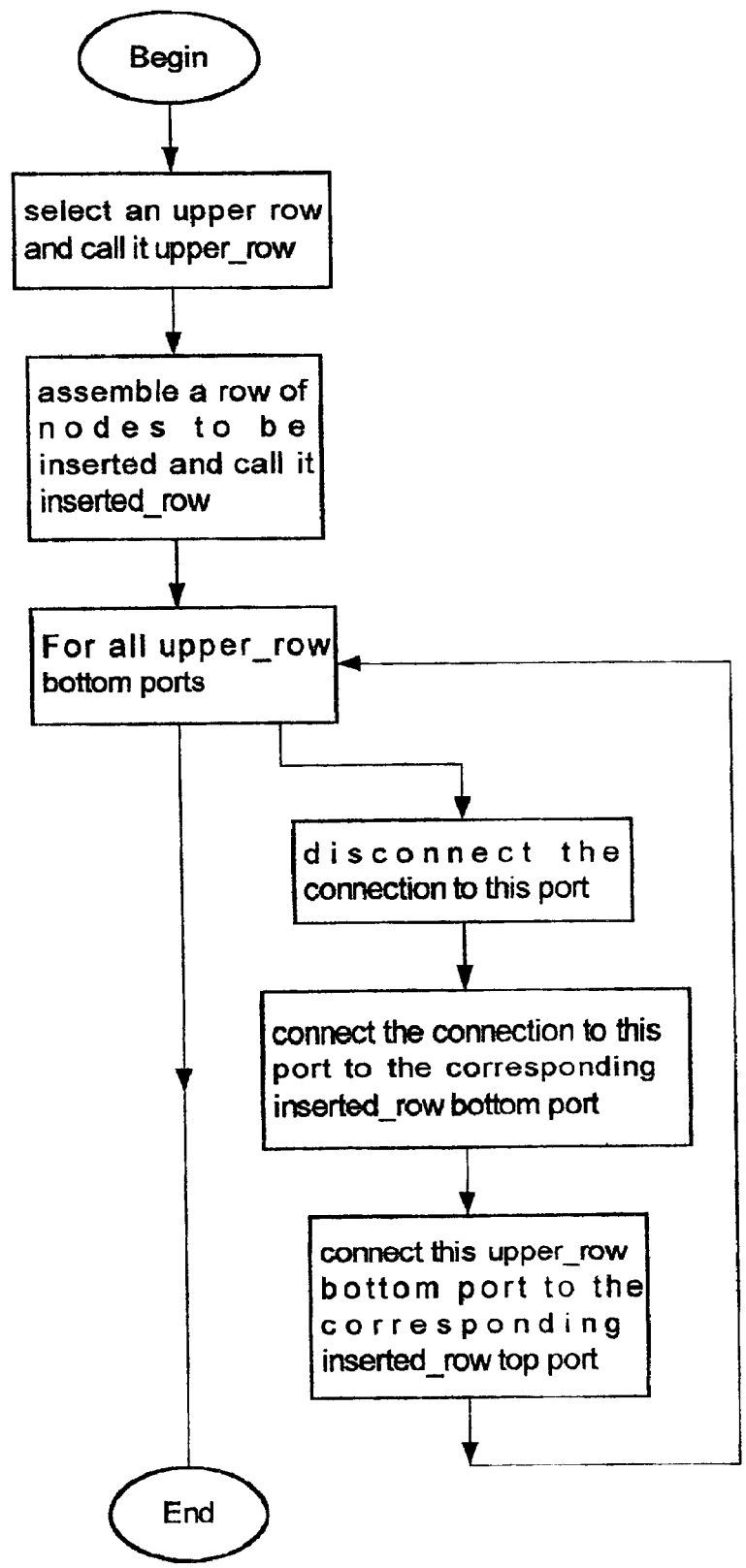
FIG. 7 show the flowchart for the insertion algorithm shown in FIG. 5.

The "stretch" procedure consists of inserting an new row of routers between an upper row and an adjacent lower row of routers. The algorithm is shown in FIG. 5 and the flowchart is shown in FIG. 7.

The "stretch" algorithm consists of: Selecting an upper__ row and calling it upper__row. Assembling a row of nodes to be inserted and calling it inserted__row. Repeating for all upper__row bottom ports: disconnecting the connection to the upper__row bottom port; connecting the connection to this port to the corresponding inserted__row bottom port; and creating a "bypass" connection pattern between the upper__row and the insert__row by connecting this upper__ row bottom port to the corresponding inserted__row top port.

In the "stretch" phase the ports of the inserted__row of routers were inserted in a left to right order. This could also have been done in a right to left manner. This could also be done in any port order and router order so long as the inserted__row bottom port and the inserted__row top port are on the same inserted__row router. This is done to equalize the input and output traffic on any router in the inserted__ row.

Any upper row of routers can be selected so long as there is an adjacent lower row of routers; however, the closer to the middle of the router array the better. This is because the maximum path redundancy occurs between the rows closest to the middle of the router array. The greater the path redundancy the greater the number of path onto which the traffic can be diverted and the smaller the effect of any connection disconnected in the course of the upgrade.

Figure 8:
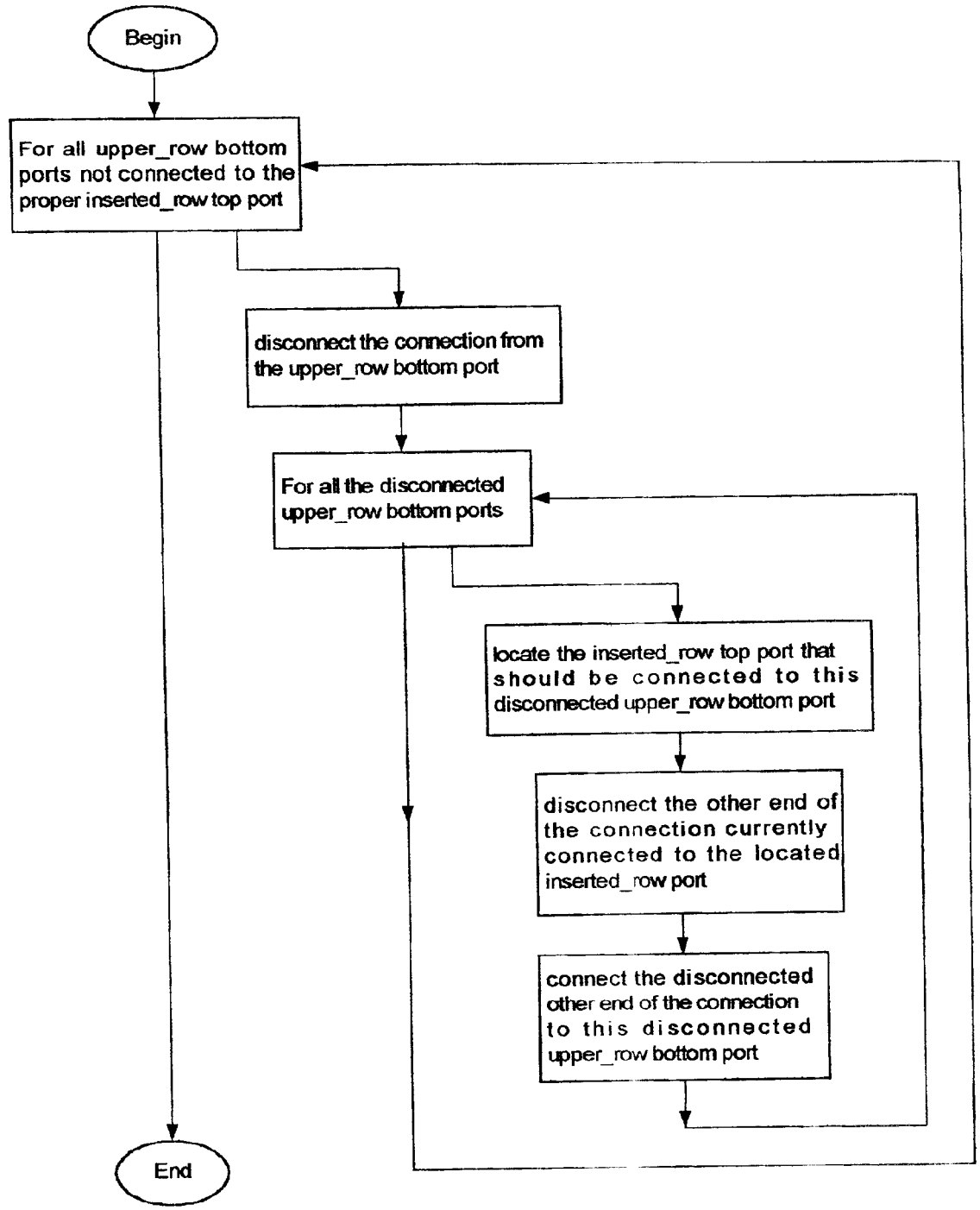
FIG. 8 shows the flowchart for the rewiring algorithm shown in FIG. 6.

The "rewire" procedure consists of rewiring the "bypass" connection pattern between the upper row bottom ports and the inserted row top ports such that it is the same as the connections between the inserted row bottom ports and the adjacent lower row top ports. The algorithm is shown in FIG. 6 and the flowchart is shown in FIG. 8.

The "rewire" algorithm consists of: Repeating for all upper_row bottom ports not connected to the proper inserted_row top port: disconnecting the connection from the upper_row bottom port; repeating for all the disconnected upper_row bottom ports: locating the inserted_row top ports that should be connected to this disconnected upper_row bottom port; disconnecting the other end of the connection currently connected to the located inserted_row port; and connecting the disconnected other end of the connection to this disconnected upper_row bottom port.

The upper_row bottom ports not connected to the proper inserted_row top ports can be disconnected in any order. A disconnected upper_row bottom port should be connected before another improperly connected upper_row bottom port is disconnected. This minimizes the disruption in the traffic between the upper_row and inserted_row.

Figure 3A:
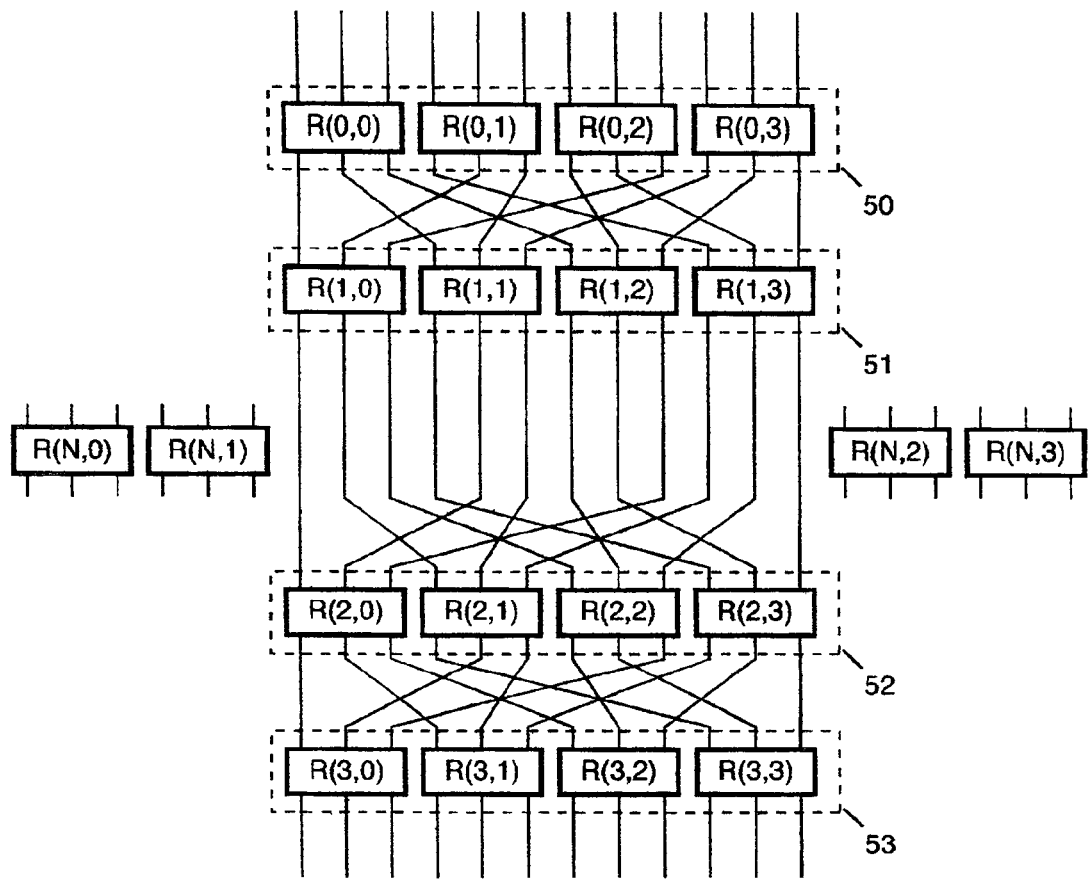
FIG. 3A shows a stretched version of a 24 port redundant blocking compensated cyclic group multi-stage switching network and a row of four routers to be inserted.

The stretch phase is shown in more detail in FIG. 3A. The RBCCG multi-stage network consists of routers R(0,0) to R(3,3) arranged in four rows, 50, 51, 52, and 53; connected with blocking compensated cyclic networks. R(N,0), R(N,1), R(N,2), and R(N,3) are the routers to be inserted to form a new row. The blocking compensated cyclic network between rows 51 and 52 is shown as stretched for purposes of illustration.

Figure 3B:
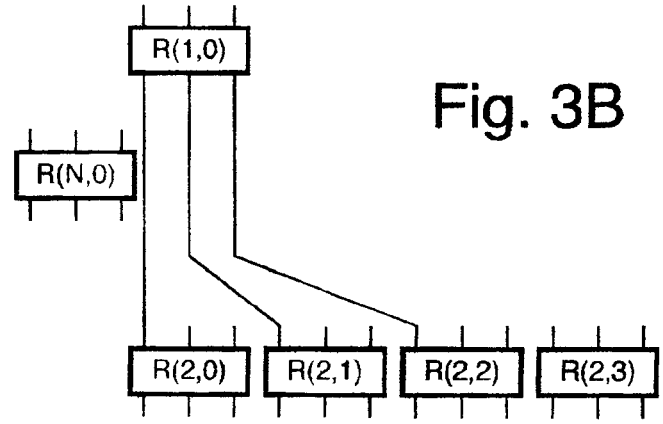
FIG. 3B shows the portion of a 24 port RBCCG multi-stage switching network into which router R(N,0) is to be inserted.
Figure 3C:
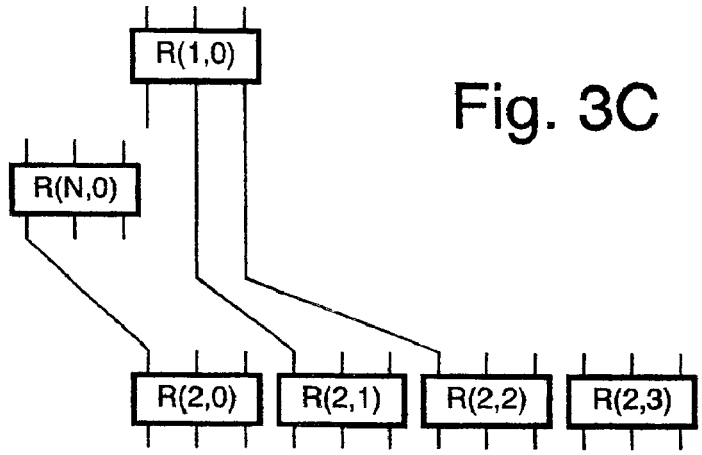
FIG. 3C, FIG. 3D, FIG. 3E, and FIG. 3F show router R(N,0) being inserted by moving the connection from bottom port 0 of R(1,0) to bottom port 0 of R(N,0); adding a connection between bottom port 0 of R(R(1,0) and top port 0 of R(N,0); moving the connection from bottom port 1 of R(1,0) to bottom port 1 of R(N,0) and adding a connection between bottom port 1 of R(1,0) to top port 1 of R(N,0); and moving the connection from the bottom port 2 of R(1,0) to bottom port 2 of R(N,0) and adding a connection between bottom port 2 of R(1,0) to top port 2 of R(N,0) respectively.
Figure 3D:
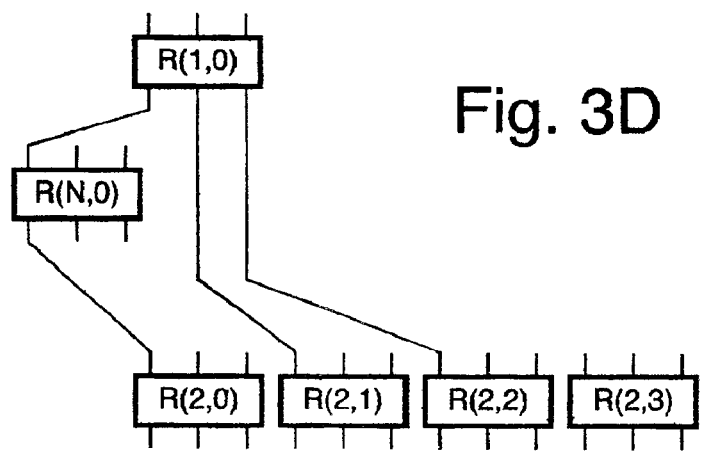

Router R(N,0) as shown in FIG. 3B can be inserted by: diverting traffic away from top port 0 of R(2,0) and bottom port 0 of R(1,0); shutting down top port 0 of R(2,0) and bottom port 0 of R(1,0); moving the connection at bottom port 0 of R(1,0) to bottom port 0 of R(N,0) as shown in FIG. 3C; starting bottom port 0 of R(N,0) and top port 0 of R(2,0); connecting bottom port 0 of R(1,0) to top port 0 of R(N,0) as shown in FIG. 3D; starting bottom port 0 of R(1,0) and top port 0 of R(N,0); and stop diverting traffic away from top port 0 of R(2,0) and bottom port 0 of R(1,0).

Figure 3E:
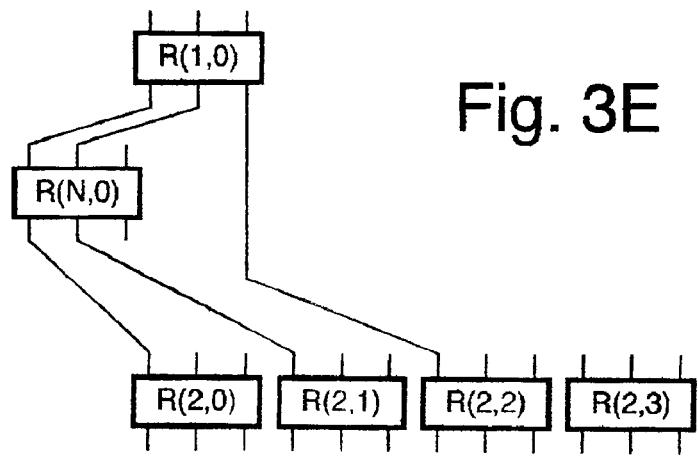

This process continues by: diverting traffic away from top port 0 of R(2,1) and bottom port 1 of R(1,0); shutting down top port 0 of R(2,1) and bottom port 1 of R(1,0); moving the connection at bottom port 1 of R(1,0) to bottom port 1 of R(N,0) as shown in FIG. 3E; starting bottom port 1 of R(N,0) and top port 0 of R(2,1); connecting bottom port 1 of R(1,0) to top port 1 of R(N,0) as shown in FIG. 3E; starting bottom port 1 of R(1,0) and top port 1 of R(N,0); and stop diverting traffic away from top port 0 of R(2,1) and bottom port 1 of R(1,0).

Figure 3F:
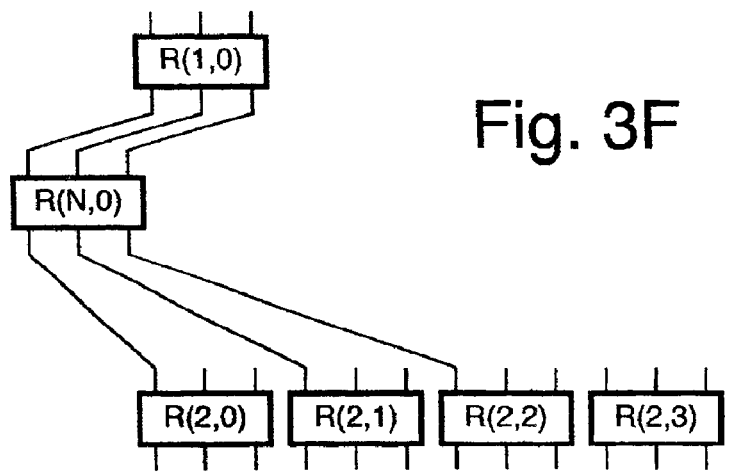

This process continues by: diverting traffic away from top port 0 of R(2,2) and bottom port 2 of R(1,0); shutting down top port 0 of R(2,2) and bottom port 2 of R(1,0); moving the connection at bottom port 2 of R(1,0) to bottom port 2 of R(N,0) as shown in FIG. 3F; starting bottom port 2 of R(N,0) and top port 0 of R(2,2); connecting bottom port 2 of R(1,0) to top port 2 of R(N,0) as shown in FIG. 3F; starting bottom port 2 of R(1,0) and top port 2 of R(N,0); and stop diverting traffic away from top port 0 of R(2,2) and bottom port 2 of R(1,0).

Figure 3G:
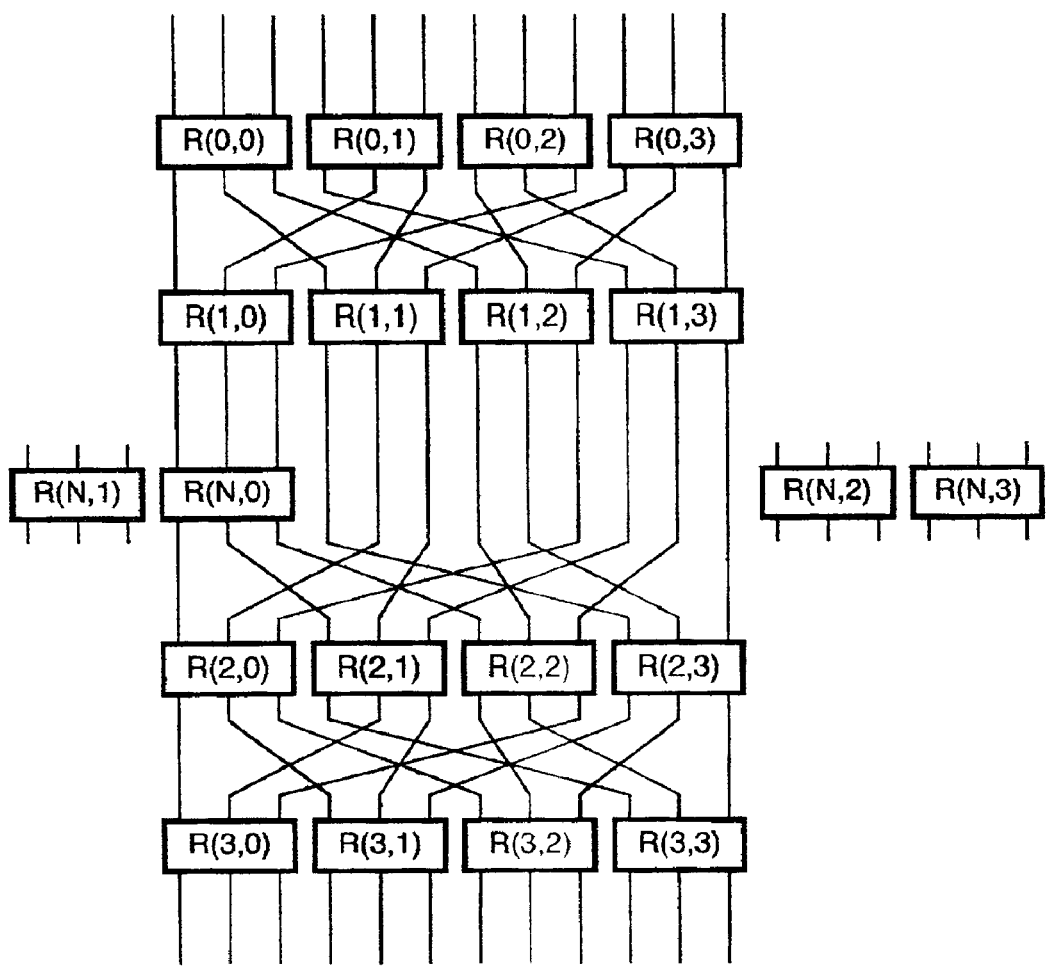
FIG. 3G shows router R(N,0) inserted into a 24 port RBCCG multi-stage switching network.
Figure 3H:
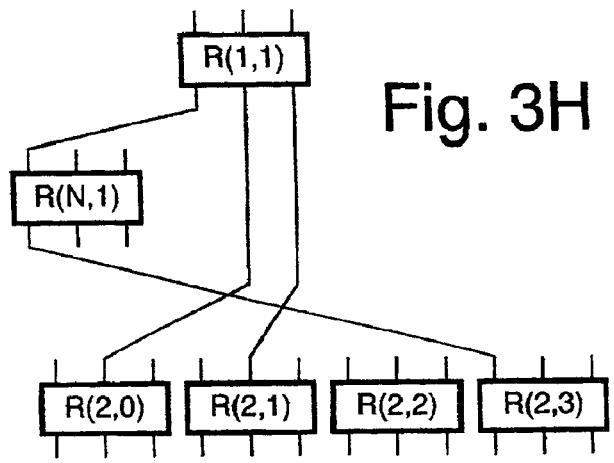
FIG. 3H, FIG. 3I, and FIG. 3J show router R(N,1) being inserted by moving the connection from bottom port 0 of R(1,1) to bottom port 0 of R(N,1) and adding a connection between bottom port 0 of R(1,1) to top port 0 of R(N,1); moving the connection from bottom port 1 of R(1,1) to bottom port 1 of R(N,1) and adding a connection between bottom port 1 of R(1,1) to top port 1 of R(N,1); and moving the connection from bottom port 2 of R(1,1) to bottom port 2 of R(N,1) and adding a connection between bottom port 2 of R(1,1) to top port 2 of R(N,1) respectively.

Router R(N,1) as shown in FIG. 3G can be inserted by: diverting traffic away from top port 0 of R(2,3) and bottom port 0 of R(1,1); shutting down top port 0 of R(2,3) and bottom port 0 of R(1,1); moving the connection at bottom port 0 of R(1,1) to bottom port 0 of R(N,1); starting bottom port 0 of R(N,1) and top port 0 of R(2,3); connecting bottom port 0 of R(1,1) to top port 0 of R(N,1) as shown in FIG. 3H; starting bottom port 0 of R(1,1) and top port 0 of R(N,1); and stop diverting traffic away from top port 0 of R(2,3) and bottom port 0 of R(1,1).

Figure 3I:
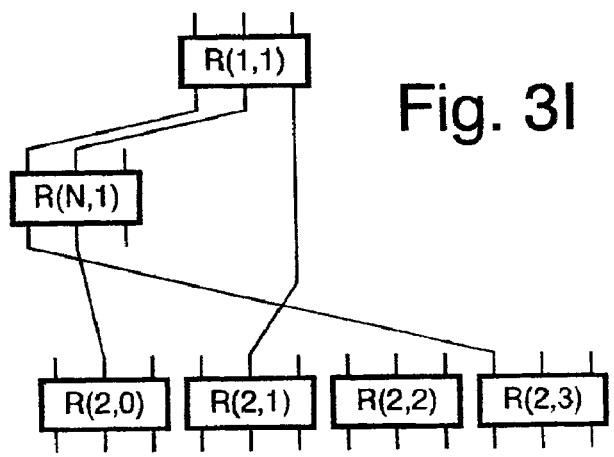

This process continues by: diverting traffic away from top port 1 of R(2,0) and bottom port 1 of R(1,1); shutting down top port 1 of R(2,0) and bottom port 1 of R(1,1); moving the connection at bottom port 1 of R(1,1) to bottom port 1 of R(N,1); starting bottom port 1 of R(N,1) and top port 1 of R(2,0); connecting bottom port 1 of R(1,1) to top port 1 of R(N,1) as shown in FIG. 3I; starting bottom port 1 of R(1,1) and top port 1 of R(N,1); and stop diverting traffic away from top port 1 of R(2,0) and bottom port 1 of R(1,1).

Figure 3J:
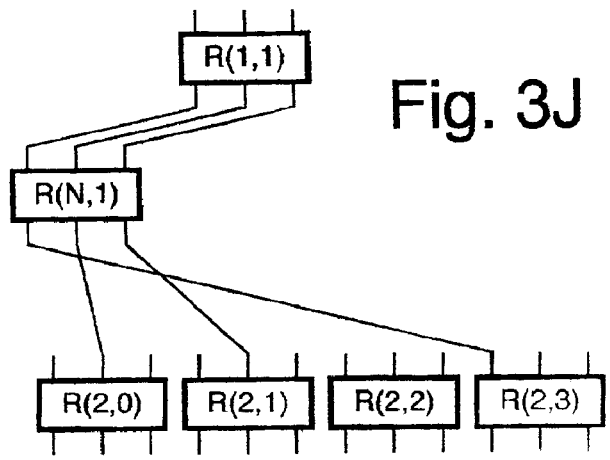

This process continues by: diverting traffic away from top port 1 of R(2,1) and bottom port 2 of R(1,1); shutting down top port 1 of R(2,1) and bottom port 2 of R(1,1); moving the connection at bottom port 2 of R(1,1) to bottom port 2 of R(N,1); starting bottom port 2 of R(N,1) and top port 1 of R(2,1); connecting bottom port 2 of R(1,1) to top port 2 of R(N,1) as shown in FIG. 3J; starting bottom port 2 of R(1,1) and top port 2 of R(N,1); and stop diverting traffic away from top port 1 of R(2,1) and bottom port 2 of R(1,1).

Figure 3K:
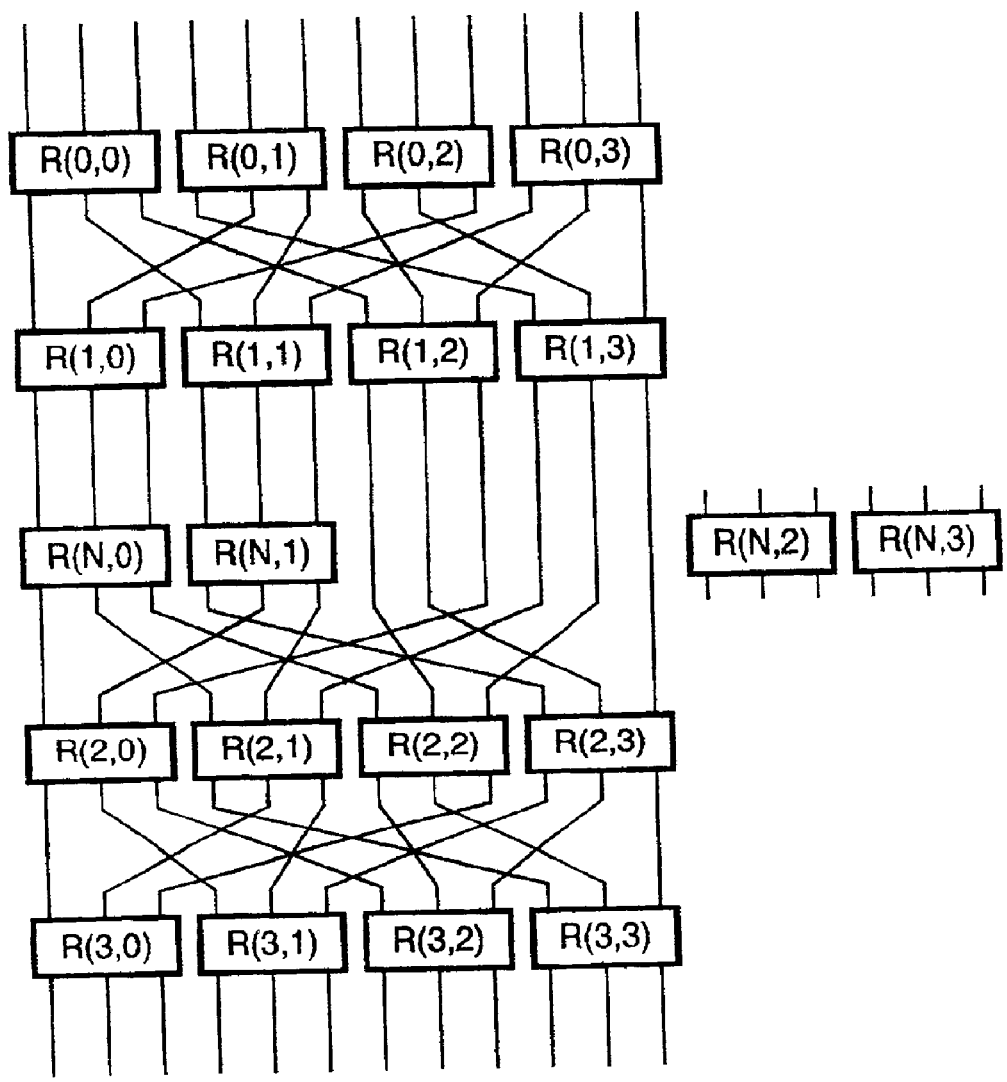
FIG. 3K shows router R(N,1) inserted into a 24 port RBCCG multi-stage switching network.
Figure 3L:
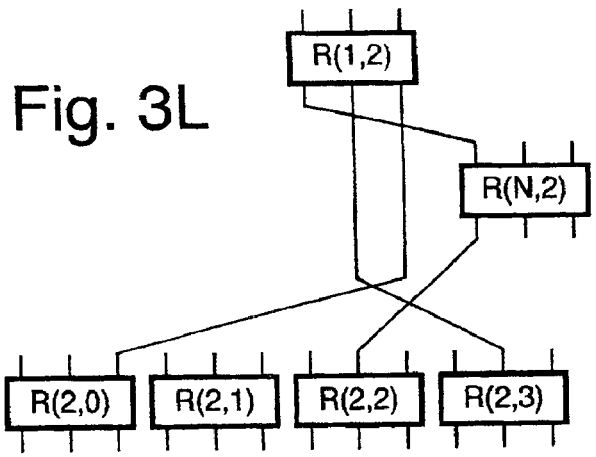
FIG. 3L, FIG. 3M, and FIG. 3N show router R(N,2) being inserted by moving the connection from bottom port 0 of R(1,2) to bottom port 0 of R(N,2) and adding a connection between bottom port 0 of R(1,2) to top port 0 of R(N,2); moving the connection from bottom port 1 of R(1,2) to bottom port 1 of R(N,2) and adding a connection between bottom port 1 of R(1,2) to top port 1 of R(N,2); and moving the connection from bottom port 2 of R(1,2) to bottom port 2 of R(N,2) and adding a connection between bottom port 2 of R(1,2) to top port 2 of R(N,2) respectively.

Router R(N,2) as shown in FIG. 3K can be inserted by: diverting traffic away from top port 1 of R(2,2) and bottom port 0 of R(1,2); shutting down top port 1 of R(2,2) and bottom port 0 of R(1,2); moving the connection at bottom port 0 of R(1,2) to bottom port 0 of R(N,2); starting bottom port 0 of R(N,2) and top port 1 of R(2,2); connecting bottom port 0 of R(1,2) to top port 0 of R(N,2) as shown in FIG. 3L; starting bottom port 0 of R(1,2) and top port 0 of R(N,2); and stop diverting traffic away from top port 1 of R(2,2) and bottom port 0 of R(1,2).

Figure 3M:
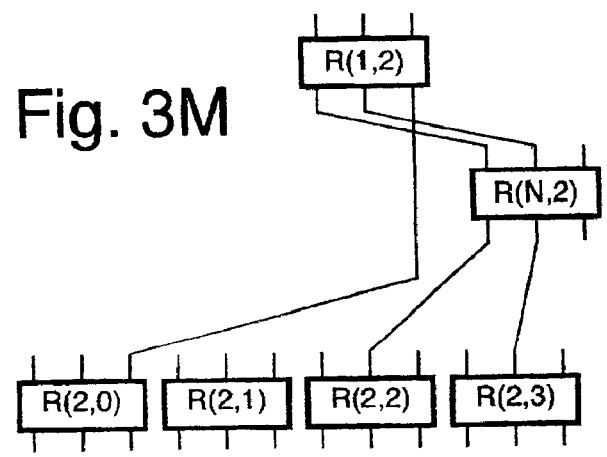

This process continues by: diverting traffic away from top port if R(2,3) and bottom port 1 of R(1,2); shutting down top port 1 of R(2,3) and bottom port 1 of R(1,2); moving the connection at bottom port 1 of R(1,2) to bottom port 1 of R(N,2); starting bottom port 1 of R(N,2) and top port 1 of R(2,3); connecting bottom port 1 of R(1,2) to top port 1 of R(N,2) as shown in FIG. 3M; starting bottom port 1 of R(1,2) and top port 1 of R(N,2), and stop diverting traffic away from top port 1 of R(2,3) and bottom port 1 of R(1,2).

Figure 3N:
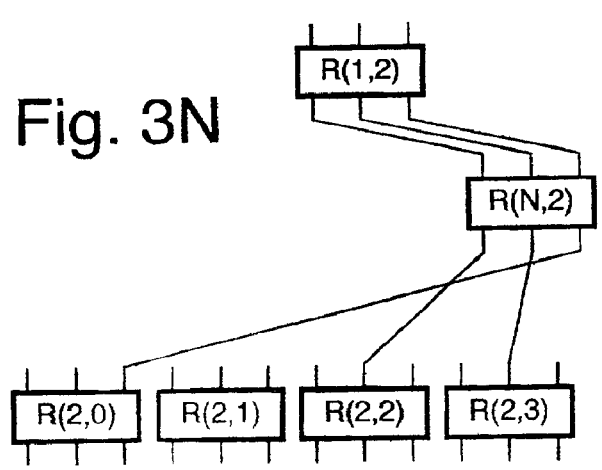

This process continues by: diverting traffic away from top port 2 of R(2,0) and bottom port 2 of R(1,2); shutting down top port 2 of R(2,0) and bottom port 2 of R(1,2); moving the connection at bottom port 2 of R(1,2) to bottom port 2 of R(N,2); starting bottom port 2 of R(N,2) and top port 2 of R(2,0); connecting bottom port 2 of R(1,2) to top port 2 of R(N,2) as shown in FIG. 3N; starting bottom port 2 of R(1,2) and top port 2 of R(N,2); and stop diverting traffic away from top port 2 of R(2,0) and bottom port 2 of R(1,2).

Figure 3O:
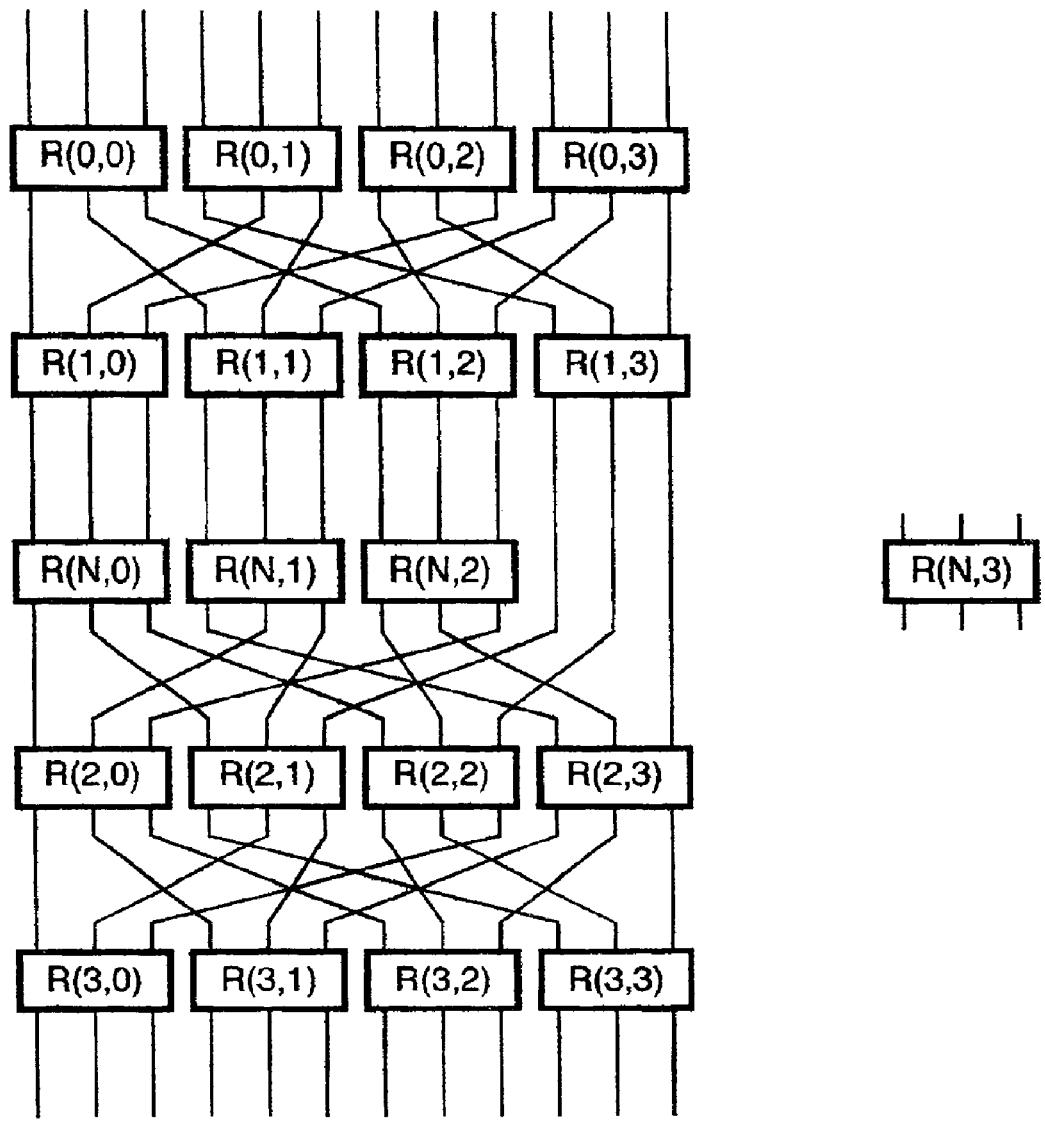
FIG. 3O shows router R(N,2) inserted into a 24 port RBCCG multi-stage switching network.
Figure 3P:
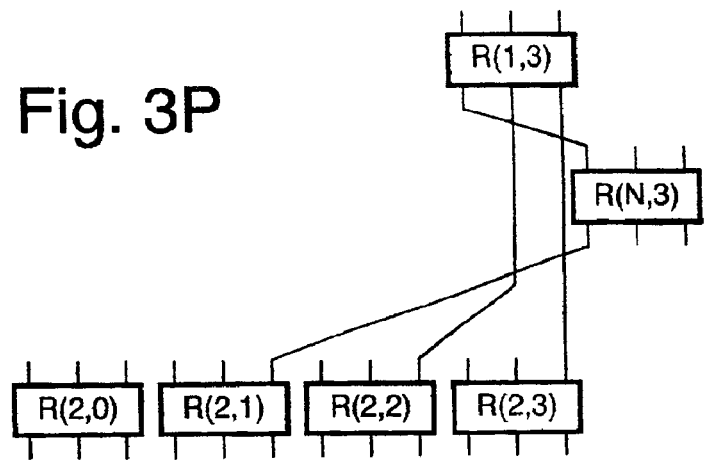
FIG. 3P, FIG. 3Q, and FIG. 3R show router R(N,3) being inserted by moving the connection from bottom port 0 of R(1,3) to bottom port 0 of R(N,3) and adding a connection between bottom port 0 of R(1,3) to top port 0 of R(N,3); moving the connection from bottom port 1 of R(1,3) to bottom port 1 of R(N,3) and adding a connection between bottom port 1 of R(1,3) to top port 1 of R(N,3); and moving the connection from bottom port 2 of R(1,3) to bottom port 2 of R(N,3) and adding a connection between bottom port 2 of R(1,3) to top port 2 of R(N,3) respectively.

Router R(N,3) as shown in FIG. 3O can be inserted by: diverting traffic away from top port 2 of R(2,1) and bottom port 0 of R(1,3); shutting down top port 2 of R(2,1) and bottom port 0 of R(1,3); moving the connection at bottom port 0 of R(1,3) to bottom port 0 of R(N,3); starting bottom port 0 of R(N,3) and top port 2 of R(2,1); connecting bottom port 0 of R(1,3) to top port 0 of R(N,3) as shown in FIG. 3P; starting bottom port 0 of R(1,3) and top port 0 of R(N,3); and stop diverting traffic away from top port 2 of R(2,1) and bottom port 0 of R(1,3).

Figure 3Q:
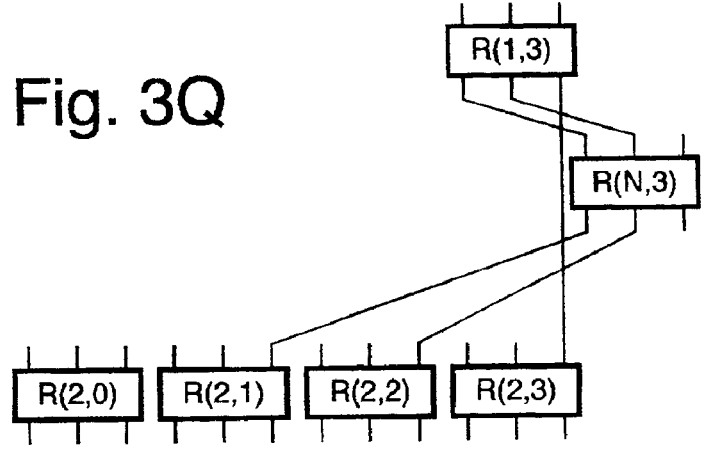

This process continues by: diverting traffic away from top port 2 of R(2,2) and bottom port 1 of R(1,3); shutting down top port 2 of R(2,2) and bottom port 1 of R(1,3); moving the connection at bottom port 1 of R(1,3) to bottom port 1 of R(N,3); starting bottom port 1 of R(N,3) and top port 2 of R(2,2); connecting bottom port 1 of R(1,3) to top port 1 of R(N,3) as shown in FIG. 3Q; starting bottom port 1 of R(1,3) and top port 1 of R(N,3); and stop diverting traffic away from top port 2 of R(2,2) and bottom port 1 of R(1,3).

Figure 3R:
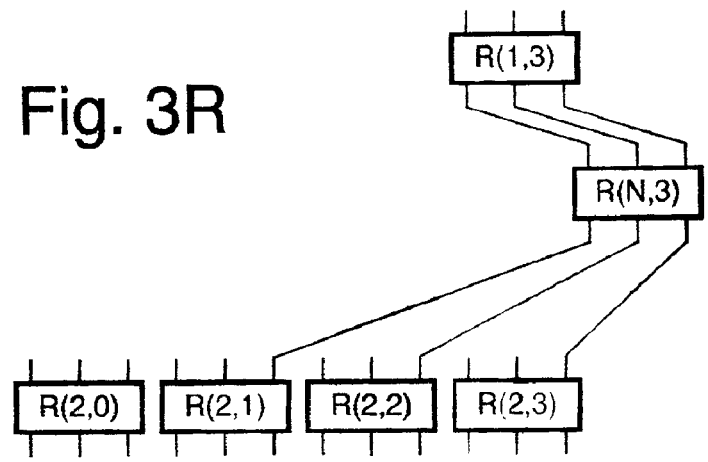

This process continues by: diverting traffic away from top port 2 of R(2,3) and bottom port 2 of R(1,3); shutting down top port 2 of R(2,3) and bottom port 2 of R(1,3); moving the connection at bottom port 2 of R(1,3) to bottom port 2 of R(N,3); starting bottom port 2 of R(N,3) and top port 2 of R(2,3); connecting bottom port 2 of R(1,3) to top port 2 of R(N,3) as shown in FIG. 3R; starting bottom port 2 of R(1,3) and top port 2 of R(N,3); and stop diverting traffic away from top port 2 of R(2,3) and bottom port 2 of R(1,3).

Figure 3S:
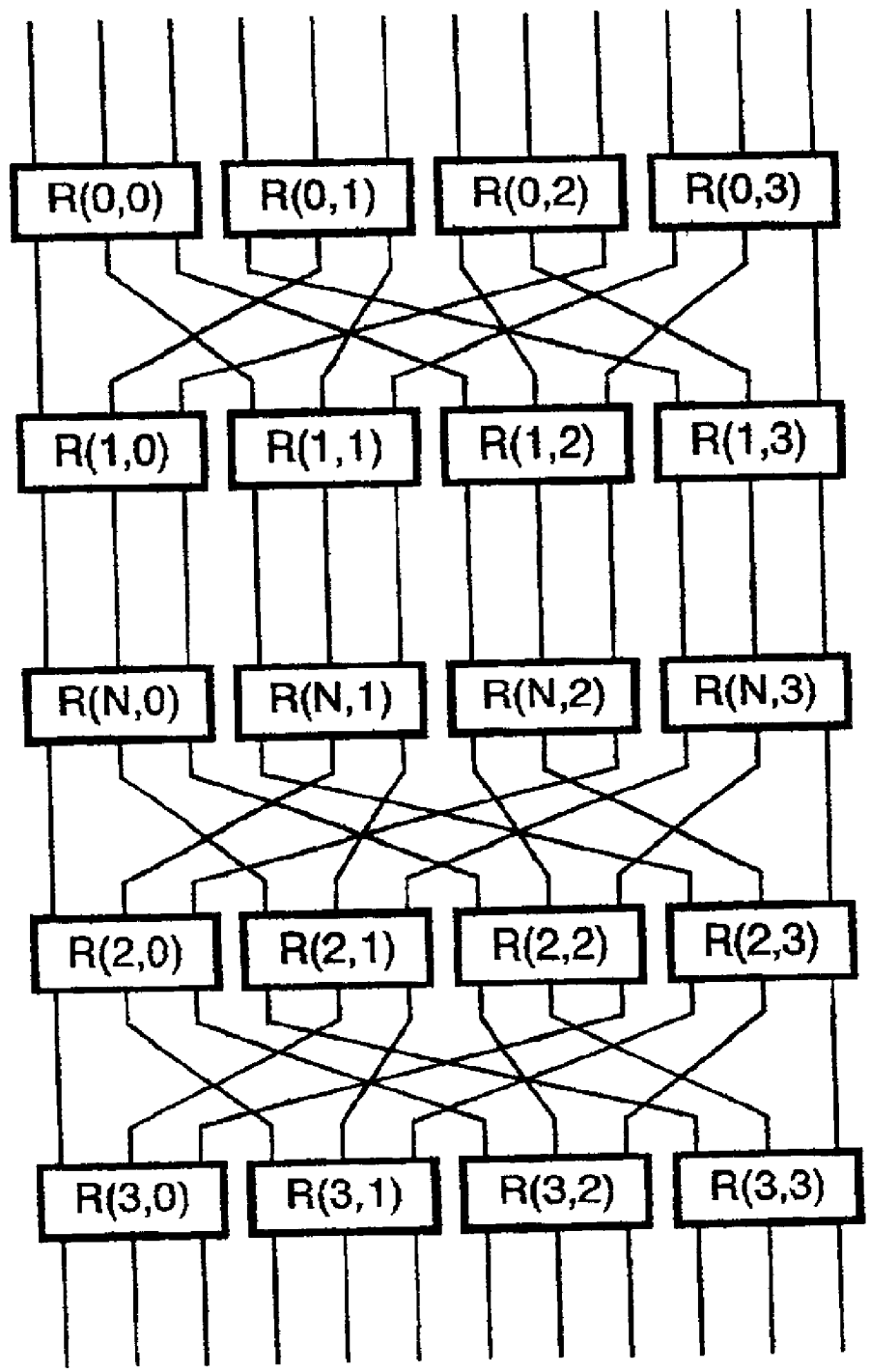
FIG. 3S shows router R(N,3) inserted into a stretched 24 port RBCCG multi-stage switching network.

The end result of inserting routers R(N,0), R(N,1), R(N, 2), and R(N,3) inserted into a stretched version of RBCCG multi-stage network 30 is shown in FIG. 3S.

In the rewiring phase the interconnection network between routers R(1,0), R(1,1), R(1,2), R(1,3) and routers R(N,0), R(N,1), R(N,2), R(N,3) as shown in FIG. 3T has to rewired to be the same as the interconnection between routers R(N,0), R(N,1), R(N,2), R(N,3) and routers R(2,0), R(2,1), R(2,2), R(2,3).

Figure 4A:
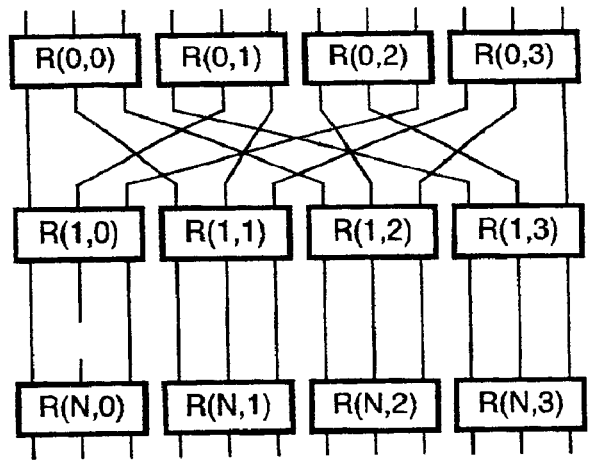
FIG. 4A, FIG. 4B, FIG. 4C, FIG. 4D, FIG. 4E, FIG. 4F, FIG. 4G, FIG. 4H, FIG. 4I, FIG. 4J, and FIG. 4K show the connections between router rows R(1,*) and R(N,*) being rewired by disconnecting top port 1 of R(N,0); disconnecting top port 0 of R(N,1) and moving the connection from bottom port 1 of R(1,0) to top port 0 of R(N,1); disconnecting top port 0 of R(N,3) and moving the connection from bottom port 0 of R(R1,1) to top port 0 of R(N,3); disconnecting top port 2 of R(N,1) and moving the connection from bottom port 0 of R(1,3) to top port 2 of R(N,1); disconnecting top port 1 of R(N,1) and moving the connection from bottom port 2 of R(1,1) to top port 1 of R(N,1); connecting previously disconnected connection from bottom port 1 of R(1,1) to top port 1 of R(N,0); disconnecting top port 2 of R(N,0); disconnecting top port 0 of R(N,2) and moving the connection from bottom port 2 of R(1,0) to top port 0 of R(N,2); disconnecting top port 1 of R(N,2) and moving the connection from bottom port 0 of R(1,2) to top port 1 of R(N,3); disconnecting top port 1 of R(N,2) and moving the connection from bottom port 1 of R(1,2) to top port 1 of R(N,3); and disconnecting top port 2 of R(N,2) and moving the connection from bottom port 1 of R(1,3) to top port 2 of R(N,2) respectively.

Starting at bottom port 0 of R(1,0) as shown in FIG. 4A and working across the row one port at a time towards bottom port 2 of R(1,3). Bottom port 0 of R(1,0) should be connected to top port 0 of R(N,0) because corresponding bottom port 0 of R(0,0) is connected to top port 0 of R(1,0). Bottom port 0 of R(1,0) is already connected to top port 0 of R(N,0) so it does not have to be moved.

Figure 4B:
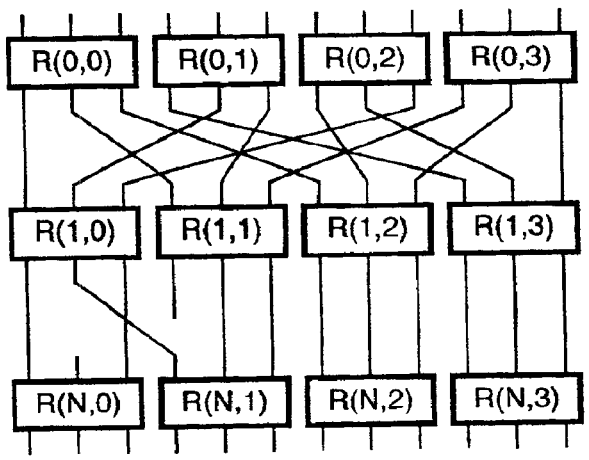

Bottom port 1 of R(1,0) should be connected to top port 0 of R(N,1) because corresponding bottom port 1 of R(0,0) is connected to top port 0 of R(1,1). Top port 0 of R(N,1) is currently connected to bottom port 0 of R(1,1). Divert traffic from top port 0 of R(N,1) and bottom port 0 of R(1,1). Stop top port 0 of R(N,1) and bottom port 0 of R(1,1). Disconnect bottom port 0 of R(1,1) and move the disconnected connection to bottom port 1 of R(1,0) as shown in FIG. 4B. Start bottom port 1 of R(1,0) and top port 0 of R(N,1). Stop diverting the traffic from bottom port 1 of R(1,0) and top port 0 of R(N,1).

Figure 4C:
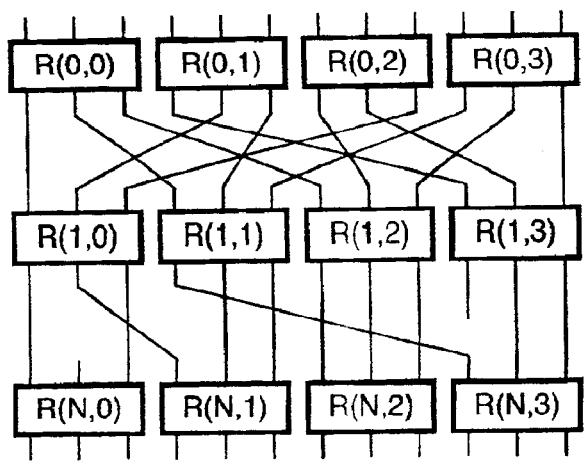

Bottom port 0 of R(1,1) should be connected to top port 0 of R(N,3) because corresponding bottom port 0 of R(0,1) is connected to top port 0 of R(1,3). Top port 0 of R(N,3) is currently connected to bottom port 0 of R(1,3). Divert traffic from top port 0 of R(N,3) and bottom port 0 of R(1,3). Stop top port 0 of R(N,3) and bottom port 0 of R(1,3). Disconnect bottom port 0 of R(1,3) and move the disconnected connection to bottom port 0 of R(1,1) as shown in FIG. 4C. Start bottom port 0 of R(1,1) and top port 0 of R(N,3). Stop diverting the traffic from bottom port 0 of R(1,1) and top port 0 of R(N,3).

Figure 4D:
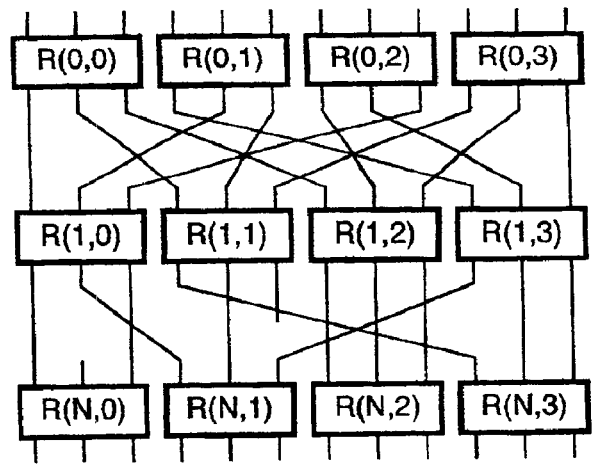

Bottom port 0 of R(1,3) should be connected to top port 2 of R(N,1) because corresponding bottom port 0 of R(0,3) is connected to top port 2 of R(1,1). Top port 2 of R(N. I) is currently connected to bottom port 2 of R(1,1). Divert traffic from top port 2 of R(N,1) and bottom port 2 of R(1,1). Stop top port 2 of R(N,1) and bottom port 2 of R(1,1). Disconnect bottom port 2 of R(1,1) and move the disconnected connection to bottom port 0 of R(1,3) as shown in FIG. 4D. Start bottom port 0 of R(1,3) and top port 2 of R(N,1). Stop diverting the traffic from bottom port 0 of R(1,3) and top port 2 of R(N,1).

Figure 4E:
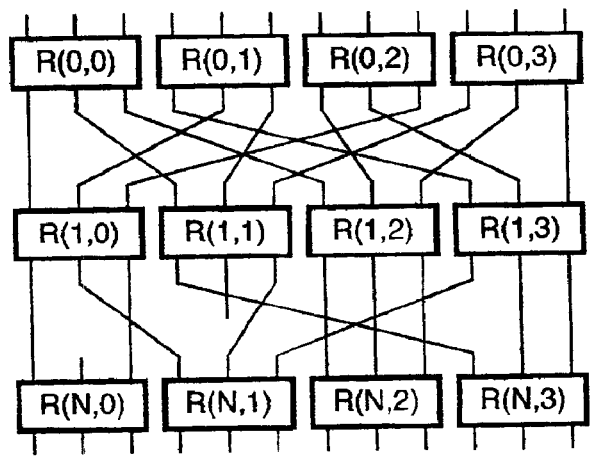

Bottom port 2 of R(1,1) should be connected to top port 1 of R(N,1) because corresponding bottom port 2 of R(0,1) is connected to top port 1 of R(1,1). Top port 1 of R(N,1) is currently connected to bottom port 1 of R(1,1). Divert traffic from top port 1 of R(N,1) and bottom port 1 of R(1,1). Stop top port 1 of R(N,1) and bottom port 1 of R(1,1). Disconnect bottom port 1 of R(1,1) and move the disconnected connection to bottom port 2 of R(1,1) as shown in FIG. 4E. Start bottom port 2 of R(1,1) and top port 1 of R(N,1). Stop diverting the traffic from bottom port 2 of R(1,1) and top port 1 of R(N,1).

Figure 4F:
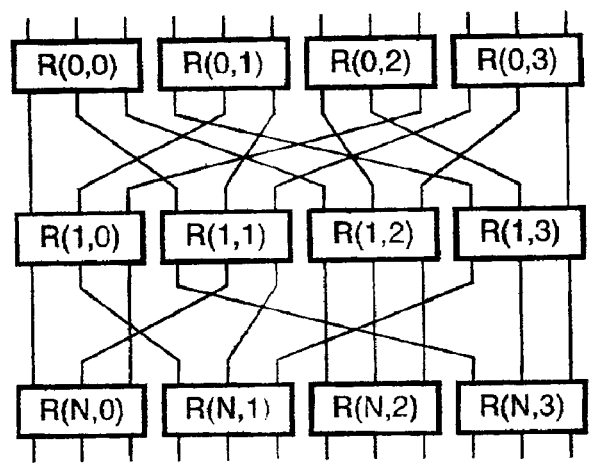

Bottom port 1 of R(1,1) should be connected to top port 1 of R(N,0) because corresponding bottom port 1 of R(0,1) is connected to top port 1 of R(1,1). Top port 1 of R(N,0) is currently disconnected. Move the disconnected connection to bottom port 1 of R(1,1) as shown in FIG. 4F. Start bottom port 1 of R(1,1) and top port 1 of R(N,0). Stop diverting the traffic from bottom port 1 of R(1,1) and top port 1 of R(N,0).

It can be seen in FIG. 4F that there are no "holes," unconnected ports. A link will have to be disconnected to create two new unconnected ports. The link to be disconnected can be determined by scanning across the links between rows R(1,*) and R(N,*) to which links are not connected in the same manner as the corresponding link between rows R(0,*) and R(1,*).

Figure 4G:
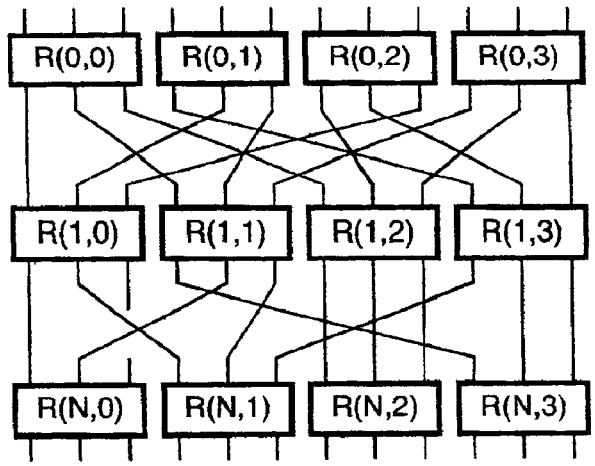

If we scan from left to right we see that the link between bottom port 0 of R(1,0) is connected to top port 0 of R(N,0) just like the corresponding link between bottom port 0 of R(0,0) and top port of R(1,0). The link between port bottom port 1 of R(1,0) is connected to top port 0 of R(N,1) just like the corresponding link between bottom port 1 of R(0,0) and top port 0 of R(1,1). However, the link between bottom port 2 of R(1,0) is connected to top port 2 of R(N,0) while the corresponding link between bottom port 2 of R(0,0) is connected to top port 0 of R(1,2). This means that link between bottom port 2 of R(1,0) and top port 2 of R(N,0) should be disconnected. This can be accomplished by diverting traffic from bottom port 2 of R(1,0) and top port 2 of R(N,0) Stopping bottom port 2 of R(1,0) and top port 2 of R(N,0). This is shown in FIG. 4G. This creates two new "holes" to fill.

Bottom port 2 of R(1,0) should be connected to top port 0 of R(N,2) because corresponding bottom port 2 of R(0,0) is connected to top port 0 of R(1,2). Top port 0 of R(N,2) is currently connected to bottom port 0 of R(1,2). Divert traffic from top port 0 of R(N,2) and bottom port 0 of R(1,2). Stop top port 0 of R(N,2) and bottom port 0 of R(1,2).

Figure 4H:
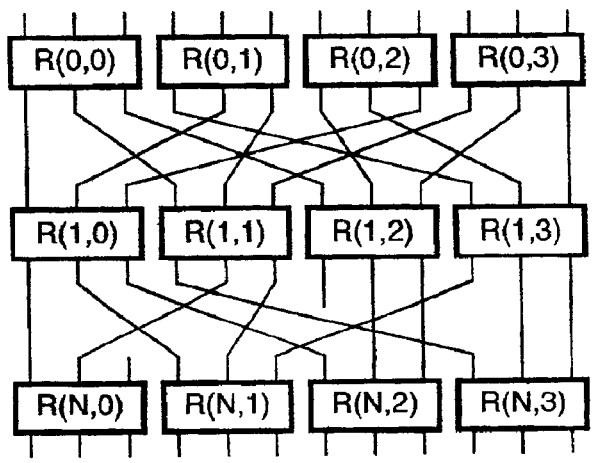

Disconnect bottom port 0 of R(1,2) and move the disconnected connection to bottom port 2 of R(1,0) as shown in FIG. 4H. Start bottom port 2 of R(1,0) and top port 0 of R(N,2) Stop diverting the traffic from bottom port 2 of R(1,0) and top port 0 of R(N,2).

Figure 4I:
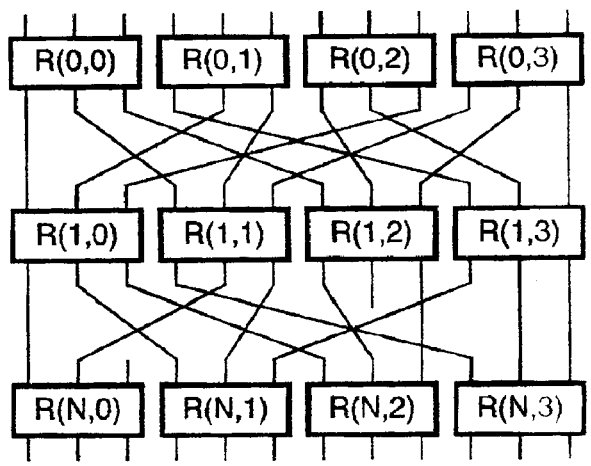

Bottom port 0 of R(1,2) should be connected to top port 1 of R(N,2) because corresponding bottom port 0 of R(0,2) is connected to top port 1 of R(1,2). Top port 1 of R(N,2) is currently connected to bottom port 1 of R(1,2). Divert traffic from top port 1 of R(N,2) and bottom port 1 of R(1,2). Stop top port 1 of R(N,2) and bottom port 1 of R(1,2). Disconnect bottom port 1 of R(1,2) and move the disconnected connection to bottom port 0 of R(1,2) as shown in FIG. 4I. Start bottom port 0 of R(1,2) and top port 1 of R(N,2). Stop diverting the traffic from bottom port 0 of R(1,2) and top port 1 of R(N,2).

Figure 4J:
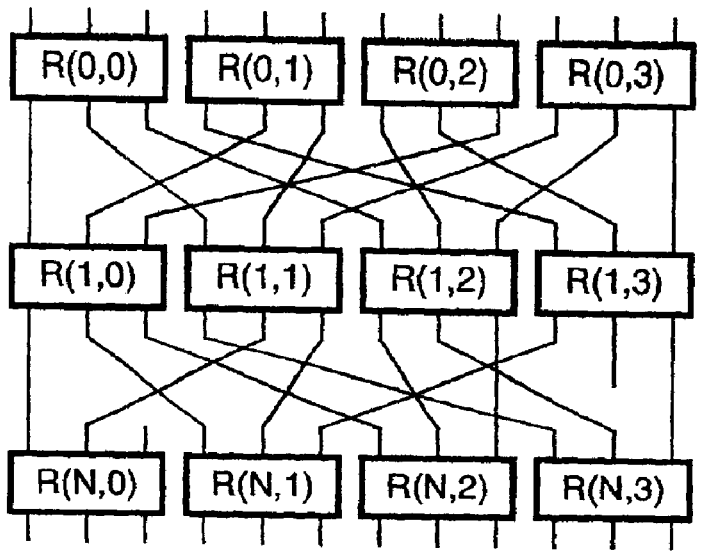

Bottom port 1 of R(1,2) should be connected to top port 1 of R(N,3) because corresponding bottom port 1 of R(0,2) is connected to top port 1 of R(1,3). Top port 1 of R(N,3) is currently connected to bottom port 1 of R(1,3). Divert traffic from top port 1 of R(N,3) and bottom port 1 of R(1,3). Stop top port 1 of R(N,3) and bottom port 1 of R(1,3). Disconnect bottom port 2 of R(1,3) and move the disconnected connection to bottom port 1 of R(1,2) as shown in FIG. 4J. Start bottom port 1 of R(1,2) and top port 1 of R(N,3). Stop diverting the traffic from bottom port 1 of R(1,2) and top port 1 of R(N,3).

Figure 4K:
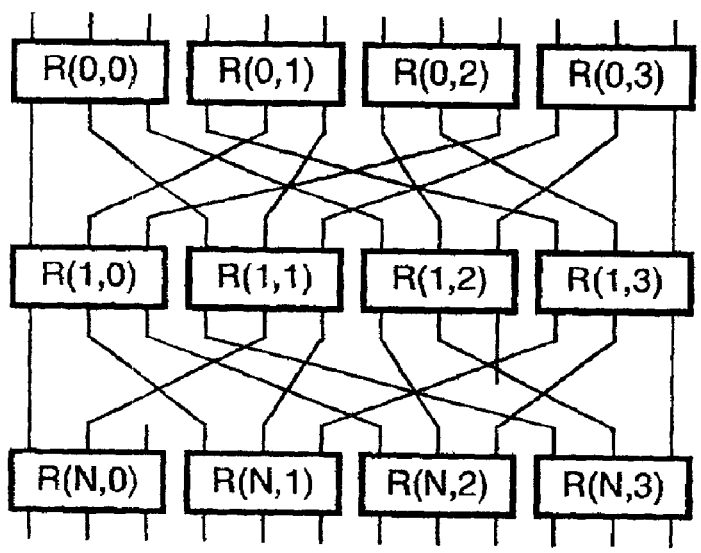

Bottom port 1 of R(1,3) should be connected to top port 2 of R(N,2) because corresponding bottom port 1 of R(0,3) is connected to top port 2 of R(1,2). Top port 2 of R(N,2) is currently connected to bottom port 2 of R(1,2). Divert traffic from top port 2 of R(N,2) and bottom port 2 of R(1,2). Stop top port 2 of R(N,2) and bottom port 2 of R(1,2). Disconnect bottom port 2 of R(1,2) and move the disconnected connection to Bottom port 1 of R(1.3) as shown in FIG. 4K. Start Bottom port 1 of R(1.3) and top port 2 of R(N,2). Stop diverting the traffic from Bottom port 1 of R(1.3) and top port 2 of R(n,2).

Disconnect bottom port 2 of R(1,2) and move the disconnected connection to bottom port 1 of R(1,3) as shown in FIG. 4K. Start bottom port 1 of R(1,3) and top port 2 of R(N,2). Stop diverting the traffic from bottom port 1 of R(1,3) and top port 2 of R(N,2).

Figure 4L:
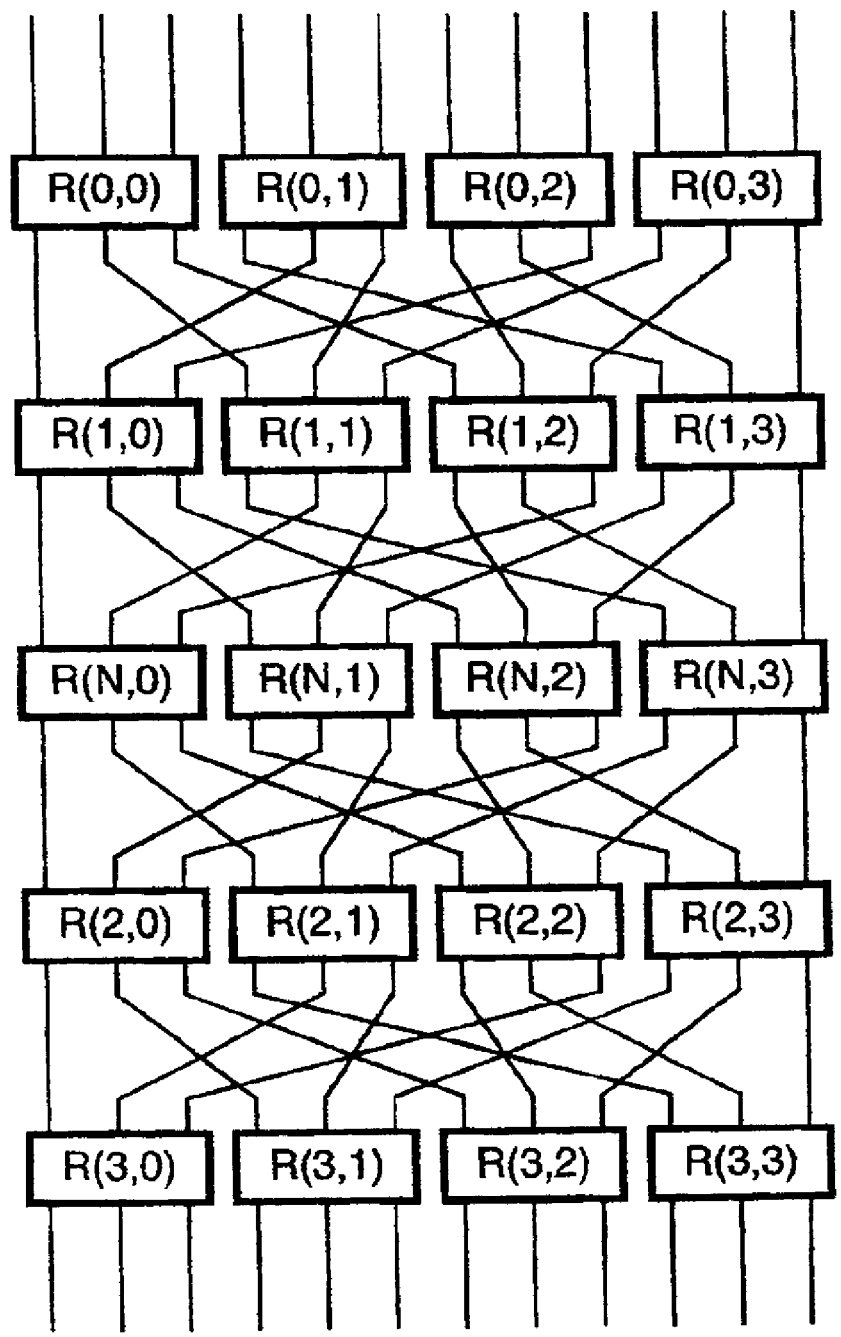
FIG. 4L shows a rewired 5 row 24 port RBCCG multi-stage switching network after moving the connection from bottom port 2 of R(1,2) to top port 2 of R(N,0).

Bottom port 2 of R(1,2) should be connected to top port 2 of R(N,0) because corresponding bottom port 2 of R(0,2) is connected to top port 2 of R(1,0). Bottom port 2 of R(1,2) is currently disconnected, the port is stopped, and the traffic diverted. Top port 2 of R(N,0) is currently disconnected, the port is stopped, and the traffic diverted. Connect Bottom port 2 of R(1,2) to top port 2 of R(N,0) as shown in FIG. 4L. Start Bottom port 2 of R(1,2) and top port 2 of R(N,0). Stop diverting the traffic from Bottom port 2 of R(1,2) and top port 2 of R(N,0).

All the links between rows **R(1,\*) and R(N,\*) are connected in the same manner as the corresponding links between rows R(0,\*) and R(1,\*). This is shown in FIG. 4L. A new row has thus been inserted between row R(1,\*) and row R(2,\*)**.

The "stretch" and "rewire" algorithms and their topological equivalents are discussed in relation to IP (Internet Protocol) routers and switches. These non-stop, minimum traffic disruption, upgrade algorithms can also be applied to arrays of ATM switches, arrays of Ethernet switches or some array of future switches or routers.

The "stretch" and "rewire" algorithms and their topological equivalents are discussed in relation to any interconnection network in which the connections between the various rows are identical and redundant. It is noted that a Banyan or a Butterfly network can be converted into a perfect shuffle based Omega network in which the interconnection networks between all the rows are identical; that a perfect shuffle network can be shown to just be a case of a n-ary shuffle network; and that a blocking compensated cyclic group network can be shown to be a super set of n-ary shuffle networks. It is also noted that a n-ary shuffle network can be made redundant by adding an additional row. Therefore, this non-stop upgrade procedure can also any network that can be converted into a redundant n-ary shuffle network.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. A method of inserting a new row of nodes into a redundant multi-stage network with a minimum amount of disruption and producing a set of parallel connections connected to the new row where the redundant multi-stage network comprises a plurality of rows each comprising a plurality of nodes each comprising a plurality of top ports and a plurality of bottom ports and where the redundant multi-stage network further comprises a plurality of connections each connection between the bottom port of a first node and a top port of a second node in a neighboring row comprising the steps of:

selecting an insertion point between two adjacent rows
      where the row above the insertion point is referred to as upper_row,
      where the row below the insertion point is referred to as lower_row, and
      where the new row is referred to as the inserted_row;
      where the nodes in upper_row are referred to as node 0 through node N−1 respectively,
      where the nodes in lower_row are referred to as node 0 through node N−1 respectively,
      where the nodes in inserted_row are referred to as node 0 through node N−1 respectively,
      where the plurality of top ports of each node in the plurality of nodes in lower_row and inserted_row consists of P top ports and are referred to as top port 0 through top port P−1 respectively, and
      where the plurality of bottom ports of each node in the plurality of nodes in upper_row and inserted_row consists of P bottom ports and are referred to as bottom port 0 through bottom port P−1 respectively;
   and repeating steps a) to d) until all bottom ports from all the nodes in the upper_row have been selected
   a) selecting a bottom port p from ports 0 to P−1 of a node n from nodes 0 to N−1 in the upper_row,
   b) disconnecting the connection connected to bottom port p of node n of upper_row,
   c) connecting the disconnected end of the connection disconnected at step (b) to bottom port p of node n in the inserted_row, and
   d) connecting bottom port p of node n of upper_row to top port p of node n of inserted_row;
   whereby the number of disconnected upper_row bottom ports and lower_row top ports at any given time is minimized.

2. The insertion point as selected in claim 1, wherein
   if the number of rows in the redundant multi-stage network is even then the inserting point is between row r/2−1 and row r/2 or
   if the number of rows in the redundant multi-stage network is odd then the insertion point is either between row (r−1)/2−1 and row (r−1)/2 or between row (r−1)/2 and row (r−1)/2+1,
   where the plurality of rows consists of r rows and the rows are referred to as row 0 to row r−1 respectively.

3. A method of rewiring a set of parallel connections in a redundant multi-stage network with a minimum of disruption into a desired topology where the redundant multi-stage network comprises a plurality of rows each comprising a plurality of nodes each comprising a plurality of top ports and a plurality of bottom ports and where the redundant multi-stage network further comprises a plurality of connections each connection between the bottom port of a first node and a top port of a second node in a neighboring row, comprising the steps of:

selecting the set of parallel connections between a row of nodes above the set of parallel connections referred to as upper_row and an adjacent row of nodes below the set of parallel connections referred to as lower_row,
      where the nodes in upper_row are referred to as node 0 through node N−1 respectively,
      where the nodes in lower_row are referred to as node 0 through node N−1 respectively,
      where the plurality of top ports of each node in the plurality of nodes of lower_row consists of P top ports and are referred to as top port 0 through top port P−1 respectively, and where the plurality of bottom ports of each node in the plurality of nodes of upper_row consists of P bottom ports and are referred to as bottom port 0 through bottom port P−1 respectively;

where the desired topology is described by a set of desired connections between two adjacent rows of nodes, where the upper adjacent row of nodes is referred to as desired_upper_row, where the lower adjacent row of nodes is referred to as desired_lower_row, where the nodes in desired_upper_row are referred to as node 0 through node N−1 respectively, where the nodes in desired_lower_row are referred to as node 0 through node N−1 respectively, where the plurality of top ports of each node in the plurality of nodes of desired_lower_row consists of P top ports and are referred to as top port 0 through top port P−1 respectively, and where the plurality of bottom ports of each node in the plurality of nodes of desired_upper_row consists of P bottom ports and are referred to as bottom port 0 through bottom port P−1 respectively; and repeating steps a) through b) for all upper_row bottom ports p where upper_row bottom port p of node n is connected to lower_row top port q of node n while corresponding desired_upper_row bottom port p of node n is not connected to desired_lower_row top port q of node n a) disconnecting the connection from upper_row bottom port p of node n, b) repeating steps 1) through 3) for disconnected upper_row bottom port p1 of node n1

1) determining that upper_row bottom port p1 of node n1 should be connected to lower_row top port q of node n2 by observing that desired_upper_row bottom port p1 of node n1 is connected to desired_lower_row top port q of node n2, 2) disconnecting the other end of the connection to lower_row top port q of node n2, and 3) connecting the disconnected end of the connection to upper_row bottom port p1 of node n1;

whereby the number of disconnected upper_row bottom ports and lower_row top ports at any given time is minimized.

4. A method of inserting a new row of nodes into a redundant multi-stage network with a minimum amount of disruption where the redundant multi-stage network comprises a plurality of rows each comprising a plurality of nodes each comprising a plurality of top ports and a plurality of bottom ports and where the redundant multi-stage network further comprises a plurality of connections each connection between the bottom port of a first node and a top port of a second node in a neighboring row comprising the steps of:

selecting an insertion point between two adjacent rows
   where the row above the insertion point is referred to as upper_row,
   where the row below the insertion point is referred to as lower_row, and
   where the new row is referred to as the inserted_row;
   where the nodes in upper_row are referred to as node 0 through node N−1 respectively,
   where the nodes in lower_row are referred to as node 0 through node N−1 respectively,
   where the nodes in inserted_row are referred to as node 0 through node N−1 respectively,
   where the plurality of top ports of each node in the plurality of nodes in lower_row and inserted_row consists of P top ports and are referred to as top port 0 through top port P−1 respectively, and
   where the plurality of bottom ports of each node in the plurality of nodes in upper_row and inserted_row consists of P bottom ports and are referred to as bottom port 0 through bottom port P−1 respectively;

repeating steps a) to d) until all bottom ports from all the nodes in the upper_row have been selected a) selecting a bottom port p from ports 0 to P−1 of a node n from nodes 0 to N−1 in the upper_row, b) disconnecting the connection connected to bottom port p of node n of upper_row, c) connecting the disconnected end of the connection disconnected at step (b) to bottom port p of node n in the inserted_row, and d) connecting bottom port p of node n of upper_row to top port p of node n of inserted_row, selecting a set of desired connections between two adjacent rows of nodes where the upper adjacent row of nodes is referred to as desired_upper_row,
   where the lower adjacent row of nodes is referred to as desired_lower_row,
   where the nodes in desired_upper_row are referred to as node 0 through node N−1 respectively,
   where the nodes in desired_lower_row are referred to as node 0 through node N−1 respectively,
   where the plurality of top ports of each node in the plurality of nodes of desired_lower_row consists of P top ports and are referred to as top port 0 through top port P−1 respectively, and
   where the plurality of bottom ports of each node in the plurality of nodes of desired_upper_row consists of P bottom ports and are referred to as bottom port 0 through bottom port P−1 respectively; and repeating steps e) through f) for all upper_row bottom ports p where upper_row bottom port p of node n is connected to inserted_row top port q of node n while corresponding desired upper_row bottom port p of node n is not connected to desired_lower_row top port q of node n e) disconnecting the connection connected to the upper_row bottom port p of node n, f) repeating steps 1) through 3) for disconnected upper_row bottom port p1 of node n1

1) determining that upper_row bottom port p1 of node n1 should be connected to inserted_row top port q of node n2 by observing that desired_upper_row bottom port p1 of node n1 is connected to desired_lower_row top port q of node n2, 2) disconnecting the other end of the connection disconnected at step (e) to inserted_row top port q of node n2, and 3) connecting the disconnected end of the connection disconnected at step (e) to upper_row bottom port p1 of node n1;

whereby the number of disconnected upper_row bottom ports and inserted_row top ports at any given time is minimized.

5. The insertion point as selected in claim 4, wherein
 if the number of rows in the redundant multi-stage network is even then the inserting point is between row r/2−1 and row r/2 or
 if the number of rows in the redundant multi-stage network is odd then the insertion point is either between row (r−1)/2−1 and row (r−1)/2 or between row (r−1)/2 and row (r−1)/2+1, where the plurality of rows consists of r rows and the rows are referred to as row 0 to row r−1 respectively.

6. A method of upgrading in a non-stop manner comprising:

designating a redundant multi-stage network for upgrading, where the redundant multi-stage network comprises a plurality of rows comprising a plurality of nodes comprising a plurality of top ports and a plurality of bottom ports and the redundant multi-stage network further comprises a plurality of connections each providing communications between two adjacent rows of nodes and coupled to a bottom port of a node of the upper adjacent row and a top port of a node of the lower adjacent row;

providing a new row comprising a plurality of nodes;

providing a desired topology;

selecting a first row of nodes from the plurality of rows and a second row of nodes from the plurality of rows, where the second row of nodes is adjacent to the first row, and where the multi-stage network has a set of connections having a second interconnection pattern interconnecting the first row and the second row;

inserting the new row between the first row and the set of connections forming a set of parallel connections between the first row and the new row, and forming a set of connections between the new row and the second row having the second interconnection pattern;

rewiring the set of parallel connections into the desired topology.

7. The method of claim 6, wherein the first row is r/2 if the number of rows in the multi-stage network is even; and (r−1)/2 or (r+1)2 if the number of rows in the multi-stage network is odd;

where the plurality of rows consists of r rows and the rows are referred to as row 0 to row r−1 respectively.

8. The method of claim 6, wherein the second row is row (k+1), where the plurality of rows consists of r rows and the rows are referred to as row 0 to row r−1 respectively, where the first row is row k and k is less than r−2.

9. The method of claim 6, wherein the second row is row (k−1) where the first row is row k, where the plurality of rows consists of r rows and the rows are referred to as row 0 to row r−1 respectively, where the first row is row k and k is greater than 0.

10. The method of claim 6, wherein the redundant multi-stage network is a redundant blocking compensated cyclic group multi-stage network.

11. The method of claim 6, where the first row is above the second row;

where the nodes in the first row are referred to as node 0 through node N−1 respectively, where the nodes in the second row are referred to as node 0 through node N−1 respectively, where the nodes in the new row are referred to as node 0 through node N−1 respectively, where the plurality of top ports of each node in the plurality of nodes in the new row consists of P top ports and are referred to as top port 0 through top port P−1 respectively, and where the plurality of bottom ports of each node in the plurality of nodes in the first row and the new row consists of P bottom ports and are referred to as bottom port 0 through bottom port P−1 respectively;

wherein the inserting the new row comprises:

repeating steps a) to d) until all bottom ports from all the nodes in the first row have been selected a) selecting a bottom port p from ports 0 to P−1 of a node n from nodes 0 to N−1 in the first row, b) disconnecting the connection connected to bottom port p of node n of first row, c) connecting the disconnected end of the connection disconnected at step (b) to bottom port p of node n in the new row, and d) connecting bottom port p of node n of the first row to top port p of node n of the new row;

whereby the number of disconnected bottom ports in the first row and top ports in the second row at any given time is minimized.

12. The method of claim 6, where the first row is above the second row, where the nodes in the first row are referred to as node 0 through node N−1 respectively, where the nodes in the new row are referred to as node 0 through node N−1 respectively, where the plurality of top ports of each node in the plurality of nodes of new row consists of P top ports and are referred to as lower_row top port 0 through lower_row top port P−1 respectively, and where the plurality of bottom ports of each node in the plurality of nodes of first row consists of P bottom ports and are referred to as upper_row bottom port 0 through upper_row bottom port P−1 respectively;

where the desired topology is described by a set of desired connections between two adjacent rows of nodes, where the upper adjacent row of nodes is referred to as desired_upper_row, where the lower adjacent row of nodes is referred to as desired_lower_row, where the nodes in desired_upper_row are referred to as node 0 through node N−1 respectively, where the nodes in desired_lower_row are referred to as node 0 through node N−1 respectively, where the plurality of top ports of each node in the plurality of nodes of desired_lower_row consists of P top ports and are referred to as top port 0 through top port P−1 respectively, and where the plurality of bottom ports of each node in the plurality of nodes of desired_upper_row consists of P bottom ports and are referred to as bottom port 0 through bottom port P−1 respectively; and wherein the rewiring the set of parallel connections comprises:

repeating steps a) through b) for all upper_row bottom ports p where upper_row bottom port p of node n is connected to lower_row top port q of node n while corresponding desired_upper_row bottom port p of node n is not connected to desired_lower_row top port q of node n a) disconnecting the connection from upper_row bottom port p of node n, b) repeating steps 1) through 3) for disconnected upper_row bottom port p1 of node n1

1) determining that upper_row bottom port p1 of node n1 should be connected to lower_row top port q of node n2 by observing that desired_upper_row bottom port p1 of node n1 is connected to desired_lower_row top port q of node n2,
2) disconnecting the other end of the connection to lower_row top port q of node n2, and
3) connecting the disconnected end of the connection to upper_row bottom port p1 of node n1;

whereby the number of disconnected upper_row bottom ports and lower_row top ports at any given time is minimized.

13. The method of claim 6, wherein each node in the plurality of nodes, has more than two top ports and two bottom ports.

14. The method of claim 13, wherein each node in the plurality of nodes, has three top ports and three bottom ports.

* * * * *